(12) United States Patent
Motomura

(10) Patent No.: US 6,995,865 B1
(45) Date of Patent: Feb. 7, 2006

(54) METHOD OF NORMALIZING COLOR INFORMATION, METHOD OF EXCHANGING COLOR INFORMATION USING THE SAME METHOD AND DEVICE USING THE SAME METHODS

(75) Inventor: Hideto Motomura, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1040 days.

(21) Appl. No.: 09/709,436

(22) Filed: Nov. 13, 2000

(30) Foreign Application Priority Data

| Nov. 11, 1999 | (JP) | ................................. 11-320538 |
| Nov. 11, 1999 | (JP) | ................................. 11-320539 |
| Aug. 23, 2000 | (JP) | ............................. 2000-252111 |
| Aug. 23, 2000 | (JP) | ............................. 2000-252112 |

(51) Int. Cl.
  *G06F 15/00* (2006.01)
  *G06K 1/00* (2006.01)
(52) U.S. Cl. ....................................... 358/1.9; 358/2.1
(58) Field of Classification Search ................. 358/1.9, 358/2.1
  See application file for complete search history.

(56) References Cited

U.S. PATENT DOCUMENTS

| 5,416,890 | A |   | 5/1995  | Beretta |
| 5,611,030 | A | * | 3/1997  | Stokes ........................ 345/590 |
| 5,883,632 | A | * | 3/1999  | Dillinger .................... 345/589 |
| 5,937,089 | A |   | 8/1999  | Kobayashi |
| 6,075,888 | A | * | 6/2000  | Schwartz .................... 382/167 |
| 6,151,136 | A | * | 11/2000 | Takemoto ................... 358/1.9 |
| 6,594,388 | B1 | * | 7/2003 | Gindele et al. ............. 382/167 |

FOREIGN PATENT DOCUMENTS

| EP | 0706285 |   | 4/1996 |
| EP | 0709808 |   | 5/1996 |
| EP | 0946050 |   | 9/1999 |
| JP | 8191400 |   | 7/1996 |
| JP | 10271351 | * | 10/1998 |

OTHER PUBLICATIONS

Patent Abstracts of Japan, vol. 1999, No. 01, Jan. 29, 1999 and JP 10 271351A, Oct. 9, 1998.
European Search Report dated Feb. 23, 2001.

* cited by examiner

*Primary Examiner*—Kimberly Williams
*Assistant Examiner*—Michael Burleson
(74) *Attorney, Agent, or Firm*—Stevens, Davis, Miller & Mosher, LLP

(57) ABSTRACT

A method of exchanging color-information includes the steps of: (1) grouping color spaces of CIELAB of a source device and an output device; (2) calculating gravity vectors and gravity points of each color category grouped in respective devices; (3) producing a color space normalized by using gravity vectors calculated for each color category of respective devices and variance covariance matrix expressing an extension from the gravity point as a center; (4) mapping control points of corresponding color category provided in respective normalized color spaces; and (5) exchanging color information by finding an agreement between the color categories of the two normalized color spaces as well as preserving color-perceptive-quantity such as chroma of two corresponding colors in the respective normalized color spaces. This method achieves that overall impressions of images rendered on each device produce difference as little as possible.

21 Claims, 25 Drawing Sheets

FIG. 3A
FIG. 3B
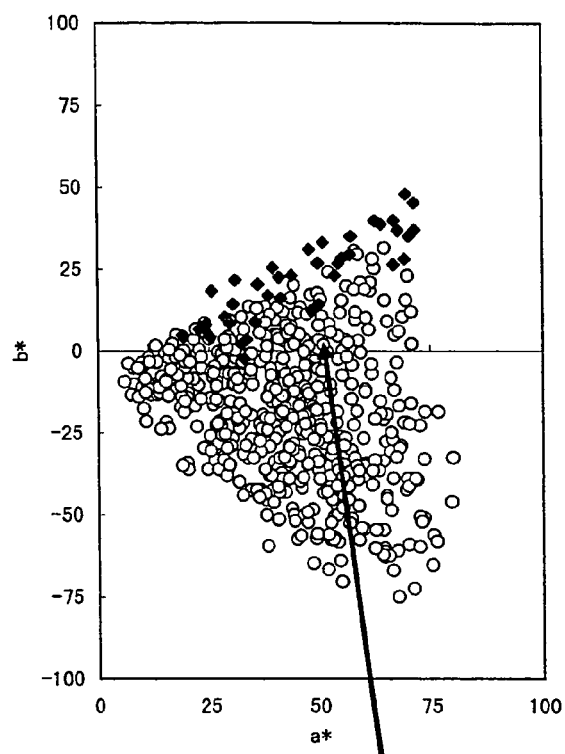
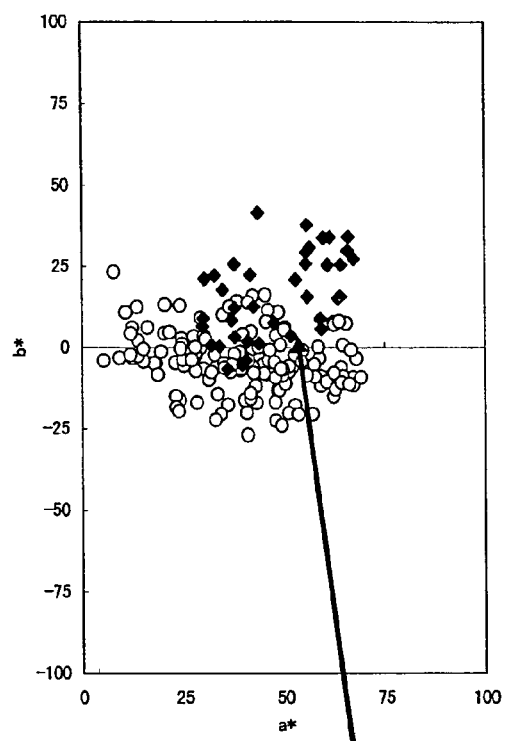
301
302

FIG. 15
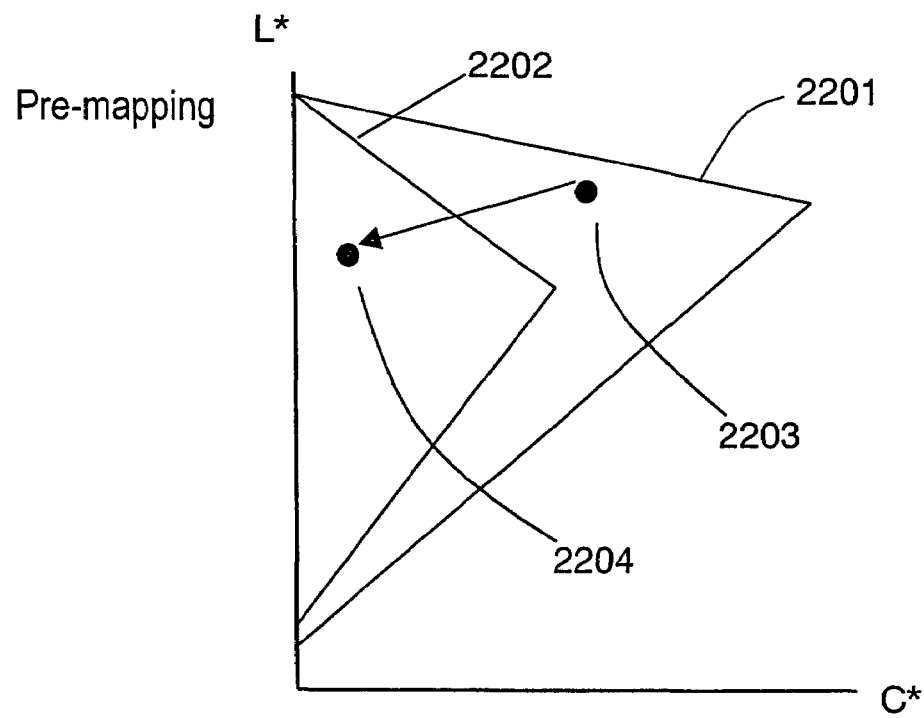
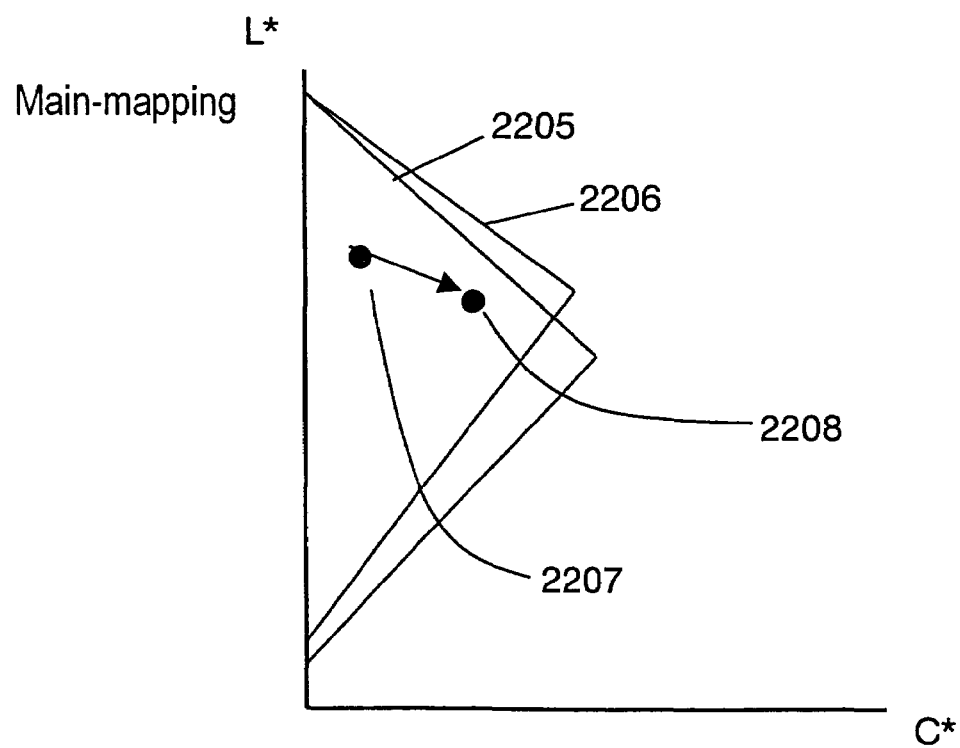

METHOD OF NORMALIZING COLOR INFORMATION, METHOD OF EXCHANGING COLOR INFORMATION USING THE SAME METHOD AND DEVICE USING THE SAME METHODS

FIELD OF THE INVENTION

The present invention relates to a method of normalizing color information, and a method of exchanging color information as well as a color information exchanging device implementing this method. Those methods and the device can realize device-independent color reproduction in a color management system—managing color information on a network to which input/output image devices such as a camera, scanner, monitor, printer and the like are hooked up.

BACKGROUND OF THE INVENTION

Advancement of the digitalization in image devices and development of network technology particularly in the Internet promote popularization of a cross-media-system. This system allows arbitrary exchanging of image information by coupling various image devices, (such as a scanner, printer and display) with each other on an open system. Businesses such as E-commerce and Telemedicien medical service requiring strict color reproduction have taken off thanks to this system.

The open system uses various devices in various viewing environments. There is a demand for color management systems (CMS), i.e., software and hardware, which are independent of both the device colorimetric characterization and viewing environments and allow color reproduction of a certain quality.

A camera or a scanner (a source device) should deliver the color information it takes in to the open system exactly. On the other hand, a display or a printer (an output device), which outputs the color information it receives, should render the information exactly.

For instance, when a camera takes in color information exactly, if a display processes the information inadequately, then the exact color information cannot be displayed. An accuracy of color reproduction by this entire system is thus lowered.

For instance in E-commerce via the Internet, a customer views goods on a display in different colors from actual ones.

However, when a color displayed area (gamut) taken by a source device is larger than the gamut of an output device, the source device should change the color information to fit within the gamut of the output device. This manipulation is referred to as "mapping." The color outside the color gamut of the output device cannot be reproduced; however, when a color image is reproduced, an image painted by colors as close as possible to the original image is required. Therefore, gamut mapping should be optimized, so that a reproduced image appears as natural as possible.

In the color management system (CMS), the following elements should be optimized because color information must be exchanged correctly between different image devices as well as viewing environments:

(1) Input/output characteristics (relation between values of device-driving-signal and colorimetric values) of respective image devices is standardized.

The principle of the CMS is to establish input/output characteristics, i.e., a relation between a video signal (e.g. RGB signals) driving an image device and colorimetric value (e.g. CIEXYZ of XYZ display system or CIELAB of L,a,b, display system, both of which are authorized by Commission International de l' Eclairage (CIE)). Then the colors from the source device are converted into device-independent color data so that any device can handle the color data through a given procedure. Then first of all, the input/output characteristics of the input/output devices linked to an open system should be standardized.

International Electrotechnical Commission (IEC) is modeling the input/output characteristics of image devices such as an LCD, PDP, scanner, digital camera, and printer, and is drafting a standard specification.

(2) Input/output characteristics of viewing-environment-dependent visual system are standardized.

Tri-stimulus value of CIEXYZ is a psychophysical quantity produced by multiplying a physical quantity of light and a spectral-response characteristic of human eyes (when it is expressed with a wave-length function, it is referred to as color matching function). Two colors having the same XYZ thus appear the same. However, when the color matching function—expressing spectral-response characteristic of the human eyes—changes depending on viewing environments and human chromatic adaptation is in different viewing environments, the two colors having the same XYZ may appear differently. This phenomenon is referred to as, in general, "different color appearance." An objective of the CMS is to reproduce, in any viewing environment, the color the output device receives as a color appearance which is the same as the color information the source device sent out.

It is thus necessary to standardize the influence of viewing environment which the input/output characteristics of a human visual system is subjected to in order to find a counterpart color (corresponding color) of the color XYZ which appears the same under a different lighting condition on a source device and an output device.

The CIE specified a color appearance model CIECAM97s in TCI-34 (Testing Color Appearance Models, Report on CIECAM97s, April 1998) where the model considers the brightness of background and the XYZ values of a white point influencing the human chromatic adaptation.

(3) Gamut mapping is optimized.

A method is studied to send out color information by compressing the entire gamut of a source device in order to fit the gamut within a smaller gamut of the output device.

Many engineers have proposed various methods of gamut compression, and the CIE is now trying to standardize the method.

Regarding the method of gamut compression, GCUSP developed by Jan Morovic has been well known; however, this method has the following problems: The GCUSP is a gamut compression method to minimize the lowering of chroma, however, it does not consider the three attributes of color reproduction comprehensively, i.e., lightness, chroma and hue after performing the gamut mapping. The color reproduction does not solely depend on chroma but the lightness and hue are also the critical factors.

The method of gamut compression cannot reproduce the same color as a color appearance or colorimetric value when a source device has a different gamut from an output device. As a result, a problem occurs that an agreement between colorimetric values or color appearances cannot be applied to as a design target.

A method of agreeing the color appearances is studied. One effective method is to control colors based on an agreement of color names.

When the gamut mapping is performed, it is impossible to render the same colors on respective devices, thus it will be a target to exchange color information between respective devices in order to show the difference in overall image as little as possible.

To achieve this target, a concept of categorical color perception is introduced. A human being has an ability of perceiving a color and another ability of grouping some colors into a color category. For instance, 'light green', 'dark green' and 'bluish green' appear to be different when they are placed sequentially; however they are grouped into one category 'green'.

If a red flower on a CRT display is printed 'a red flower' in the same category on a sheet of paper, viewers do not mind subtle differences and get an impression that the two images are the same; however, when it is printed in a different color category such as 'a yellow flower' or 'a flower of orange color', the viewers get an impression that the two images are different.

Further, when a flower's red has more intensity than an apple's red on a CRT, it is preferable to see the flower's red with more intensity than the apple's red on a printed matter, and it is not preferable to see the flower's red with less intensity than the apple's red.

It is effective to exchange color information thereby agreeing color names between a source device and an output device, and yet, preserving a perceptive quantity relation of a color such as chroma and the like in order to minimize a difference of entire images in gamut mapping.

Consider colors having a color difference between two points existing in a color space of a source device. When the color difference is strictly preserved and the two colors are mapped in an output device, the difference of the two colors from the viewpoint of the color difference is the same on the source device and the output device. However, when a color categorical control is not built in the CMS, the two colors in the same color category on the source device may be mapped at the spots striding over a boundary between color categories and reproduced in two colors having different color names.

A method of color adjustment based on an agreement of color names is disclosed in Japanese Patent Application Non-examined Publication No. H08-191400. This method is manipulated by an operator when he or she adjusts a color rendered on a display so that the color can agree with a given name of a target color.

To be more specific, the colorimetric value of each pixel of an image is expressed in lightness (L), chroma (C) and hue (H) in a polar coordinate system. Then the differences of each element between a reference color and a target color, i.e. $\Delta L$, $\Delta C$ and $\Delta H$ are added to the color before adjustment, and the color after adjustment is obtained. Among the colors after adjustment, the color having color names different from those of target colors are re-adjusted with respect to the differences $\Delta L$, $\Delta C$ and $\Delta H$. In re-adjusting, $\Delta L/n$, $\Delta C/n$ and $\Delta H/n$ are used (n: numeral around 10). If the re-adjustment cannot find the agreement with the color name of the target color, the method changes the 'n' and repeat the adjustment of the differences until the color name finds the agreement.

However, the color adjustment method discussed above has still have the following problems:

First, differences of $\Delta L$, $\Delta C$ and $\Delta H$ are changed repeatedly on a trial and error basis until the color name find the agreement. This procedure incurs increased work time, and yet, an image after the adjustment tends to be dispersed.

Second, the names of colors adjusted with the differences of $\Delta L$, $\Delta C$ and $\Delta H$ differ from those of the target colors, and they are re-adjusted with the differences of $\Delta L/n$, $\Delta C/n$ and $\Delta H/n$. In this case 'n' is determined by a trial and error process. The trial and error process incurs increased work time, and the image after the adjustment is vulnerable to dispersion. Further, when a plurality of adjusted colors are available, determining 'n' by trial and error may reverse the positions of the adjusted colors in color space, or produce a color-skip. These phenomena are viewed as a pseudo outline and degrade the color reproducibility.

SUMMARY OF THE INVENTION

The present invention addresses the problems discussed above, and provides a method and device for exchanging color information. The method includes (1) grouping the CIELAB color spaces both of a source device and an output device into a plurality of color categories, (2) producing a normalized color space by using gravity vectors calculated for each color category of respective devices as well as a variance covariance matrix expressing extension from a point of gravity as a center, (3) mapping control points of the same color categories provided in the respective normalized color spaces, (4) finding an agreement of color categories between the two normalized color spaces and, (5) preserving color perceptive quantities such as chorma and the like of the two corresponding colors in the normalized color spaces, whereby the color information is exchanged. This method produces differences that are as small as possible in overall impressions of the images of respective devices.

A color-information-exchanging-device of the present invention, in an apparatus transmitting the color information from a source device to an output device, comprises the following five elements:

(1) a color-naming-database for the source device, storing:
   a colorimetric value corresponding to a color name a viewer provides in response to the color stimuli;
   a gravity vector of respective colors calculated from the colorimetric values;
   a variance covariance matrix expressing an extension of a color category calculated from the colorimetric values; by rendering color stimuli on the source device, (2) a color-naming-database for the output device, storing:
   a colorimetric value corresponding to a color name a viewer provides in response to the color stimuli; a gravity vector of respective colors calculated from the colorimetric values; a variance covariance matrix expressing an extension of a color category calculated from the colorimetric values, by rendering color stimuli on the output device;

(3) a normalizing section of color information for the source device for calculating a normalized distance between the gravity vector and the colorimetric value of the source device based on the variance covariance matrix;

(4) a mapping control section for converting the normalized distance to target normalized distance which is a normalized distance in a color space of the output device with a coefficient by comparing the gravity vector read out from respective databases with covariance matrixes thereby finding a conversion coefficient from the comparison difference; and (5) a target normalized distance searching section for searching the color space of the output device for a colorimetric value at the target normalized distance from the gravity of respective colors.

This color-information-exchanging-device avoids the difference in overall impression between a reproduced image on the output device and an original image on the source device even when the gamut of the source device differs greatly from that of the output device.

BRIEF DESCRIPTION OF THE DRAWINGS

FIG. 3(a) shows a color distribution of a red category and a pink category displayed on a CRT display.

FIG. 3(b) shows a color distribution of a red category and a pink category printed by a printer.

FIG. 15 illustrates processes of a main mapping and a pre-mapping when lightness mapping from a CRT display to a printer is performed in accordance with the second exemplary embodiment of the present invention.

DESCRIPTION OF THE EXEMPLARY EMBODIMENTS

Exemplary Embodiment 1

The first exemplary embodiment of the present invention is demonstrated hereinafter with reference to the accompanying drawings.

Figure 1:
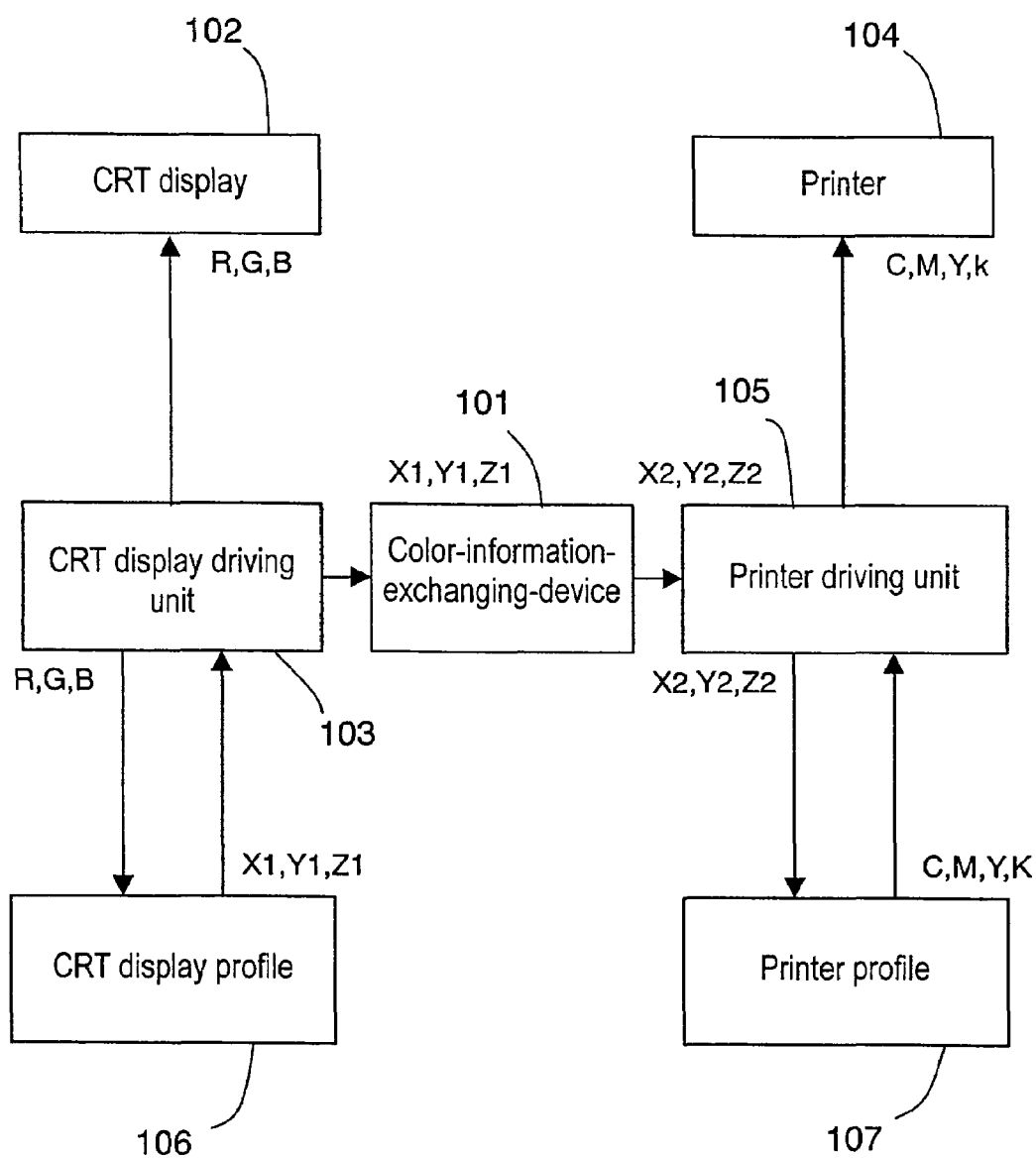
FIG. 1 is a block diagram of a color management system incorporating a first exemplary embodiment of a color-information-exchanging-device of the present invention.

FIG. 1 is a block diagram of a color management system (CMS) incorporating the first exemplary embodiment of a color-information-exchanging-device of the present invention.

For simplifying the description, an image on a CRT display is printed out by a printer in FIG. 1.

The CRT display is used as a source device and the printer is used as an output device. In FIG. 1, color-information-exchanging-device 101 converts the color information (colorimetric value X1, Y1, Z1) displayed on CRT display 102 into corresponding color information (colorimetric value X2, Y2, Z2) of printer 104. Device 101 then outputs the converted information, where the corresponding color information appears the same as the color information of the CRT display. CRT display driving unit 103 supplies a drive signal (R,G,B signals) colorimetrically adequate into CRT display 102 based on the display's input/output characteristics described in a CRT display profile. Driving unit 103 also converts the drive signal into tri-stimulus values (X1, Y1, Z1)—color information independent of input/output characteristics of display 102, then outputs the converted values to color-information-exchanging-device 101. Printer driving unit 105 converts tri-stimulus values (X2, Y2, Z2) colorimetrically adequate into a drive signal (C, M, Y, K signals) based on the printer input/output characteristics described in printer's profile 107. Then, driving unit 105 outputs the converted signal to printer 104.

Before the color-information-exchanging-device of the present invention is demonstrated, some premises will now be described hereinafter.

First, each gamut of the CRT display and the printer is described.

FIG. 2 shows an example of each gamut of the CRT display and the printer.

Figure 2A:
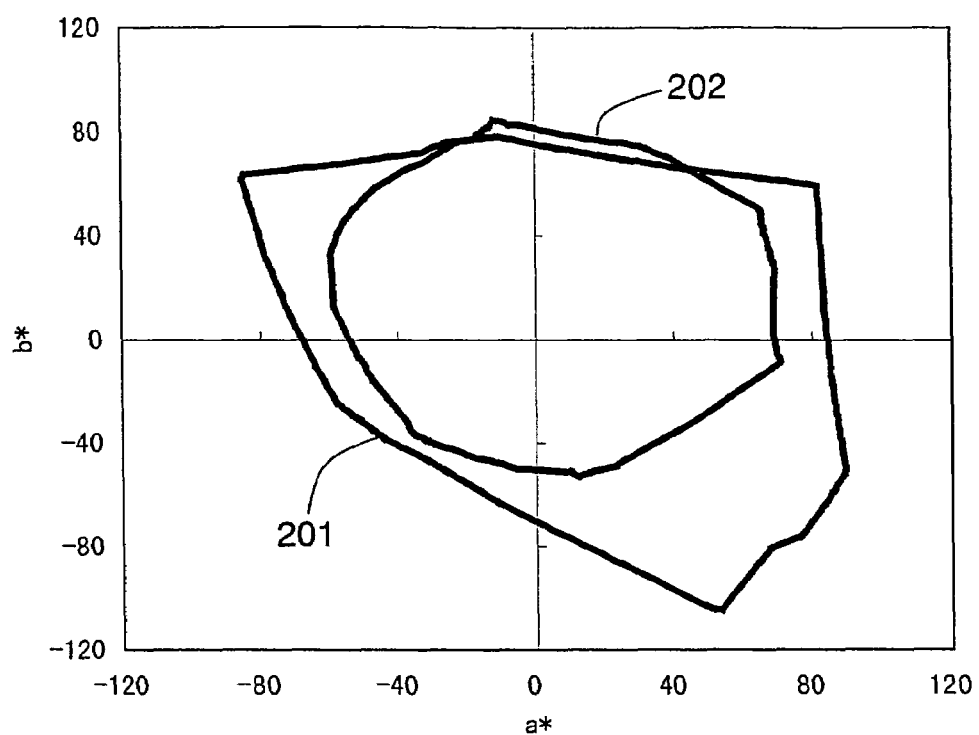
FIG. 2(a) shows a gamut of a CRT display and a printer.

FIG. 2(a) is a projection drawing where the gamut is projected to the plane of a–b of CIELAB's color space.

In FIG. 2(a), inside of gamut boundary 201 is a gamut of the CRT display. Inside of gamut boundary 202 is a gamut of the printer.

Figure 2B:
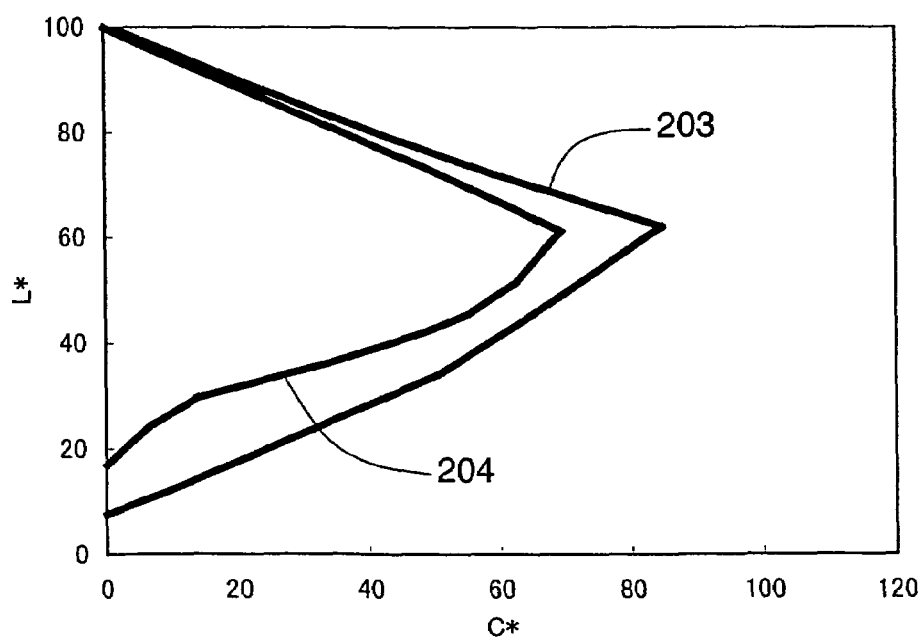
FIG. 2(b) shows another gamut of a CRT display and a printer.

FIG. 2(b) shows cross sections of each gamut being cutoff at hue-angle 0 degree in a cylindrical coordinate converted from the coordinate of CIELAB's color space. In the cylindrical coordinate, the horizontal-axis represents chroma (C) and the vertical-axis represents lightness (L). In FIG. 2(b), inside of gamut boundary 203 is a gamut of the CRT display, and inside of gamut boundary 204 is a gamut of the printer. FIG. 2(a) and FIG. 2(b) indicate that the CRT display has a greater gamut than the printer, and when an image on the CRT display is output to the printer, gamut mapping is needed.

Second, a color temperature is described hereinafter. A typical white point's color temperature of the CRT display is 9300K. The color temperature of a paper white of a printer can be adjusted at the same temperature as that of the CRT display at the printing site. However, a standard viewing condition ISO13655 specifies the viewing temperature at 5000K. Therefore, the paper white of the printer shows a color temperature 5000K under the standard viewing condition. Actually, it is a rare case that a color temperature of a room lamp agrees with 5000K.

CRT displays are often viewed under the room lamp, and the light of the room lamp is intermingled with self-emitting light from the CRT display, therefore, a gamut mapping dealing with an arbitrary color temperature is demanded.

Regarding the color temperature, there are cases where the CRT display has the same color temperature as the printer, while the CRT display has a different color temperature from the printer.

In general, an image displayed on the CRT display often does not match with an image printed by the printer. Therefore, there is a need for a predictable mapping—the color rendered on a source device with the corresponding color appearing on an output device.

Third, a color categorical characteristic is described hereinafter.

FIGS. 3(a) and 3(b) show experimental data including color-category-names (categorical color naming) viewers give to the colors displayed on the CRT display or printed by the printer.

In the CIELAB's color space, three-dimensional color vectors are produced at random, and the three-dimensional vectors within a reproducible range as test colors are shown to viewers. Viewers then select a name out of 11 basic categorical color names, i.e., white, black, red, green, yellow, blue, purple, pink, orange, gray and brown. The experiment has been done in this way as discussed above.

In FIGS. 3(a) and 3(b) selected red (represented by black points) and selected pink (represented by white points) are plotted on the plane of a–b of CIELAB's color space. FIG. 3(a) shows a result of the naming by displayed colors on the CRT display, and FIG. 3(b) shows a result of the naming by printed colors.

When FIG. 3(a) and FIG. 3(b) are compared, there are differences in color categorical distribution even in a common gamut shared by both the devices. This means that when the bare CIELAB value is sent from the CRT display to the printer, a color-categorical mismatching occurs.

In FIGS. 3(a) and (b), color 301 displayed on the CRT display and color 302 printed have the same CIELAB values; however, this color is perceived as 'pink' on the printed paper, and that color is perceived as 'red' on the CRT display. Accordingly, when a color displayed on a CRT display and a color having the same CIELAB value as the color displayed on the CRT appear on a sheet of paper by a printer, the printed colors have different color names. This phenomenon lowers color reproducibility. Thus, the mapping should be controlled so that the two colors may have the same color names. This control is a key to improving the color reproducibility.

Figure 4:
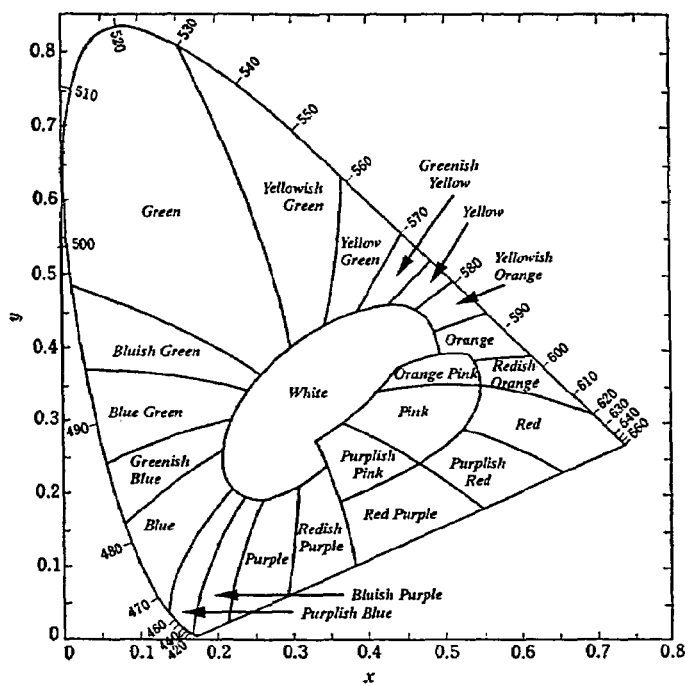
FIG. 4 shows the color region indicated by Kelly.
Figure 5:
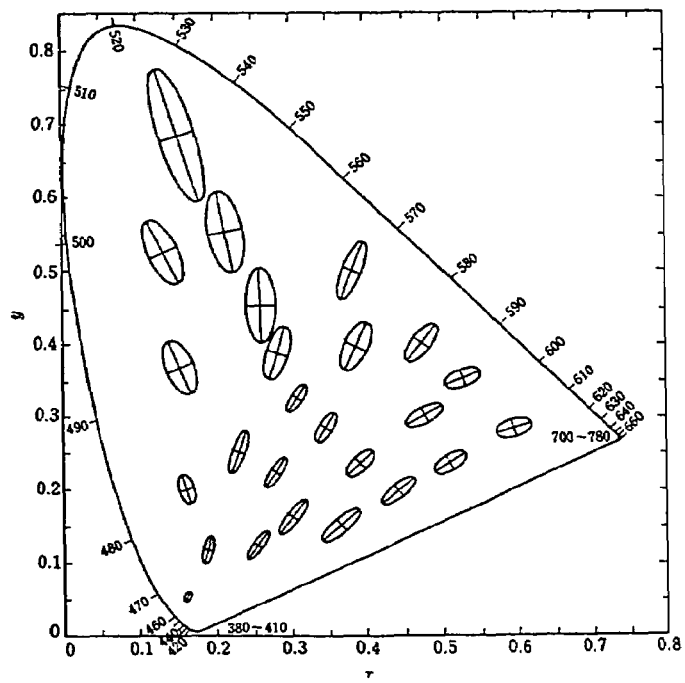
FIG. 5 shows the chromaticity diagram made by MacAdam

FIG. 4 shows the color region indicated by Kelly (reference document: Basic Color Engineering written by Mitsuo Ikeda, p 110) and FIG. 5 shows the chromaticity diagram made by MacAdam (reference document: Basic Color Engineering, by Mitsuo Ideda, p 137). The ovals are enlarged 10 times for easy understanding.

This result leads to the following prediction: A group of colors, e.g. 'green', 'yellowish green' and 'bluish green' which Kelly used, can be expressed in three-dimensional oval.

Figure 6:
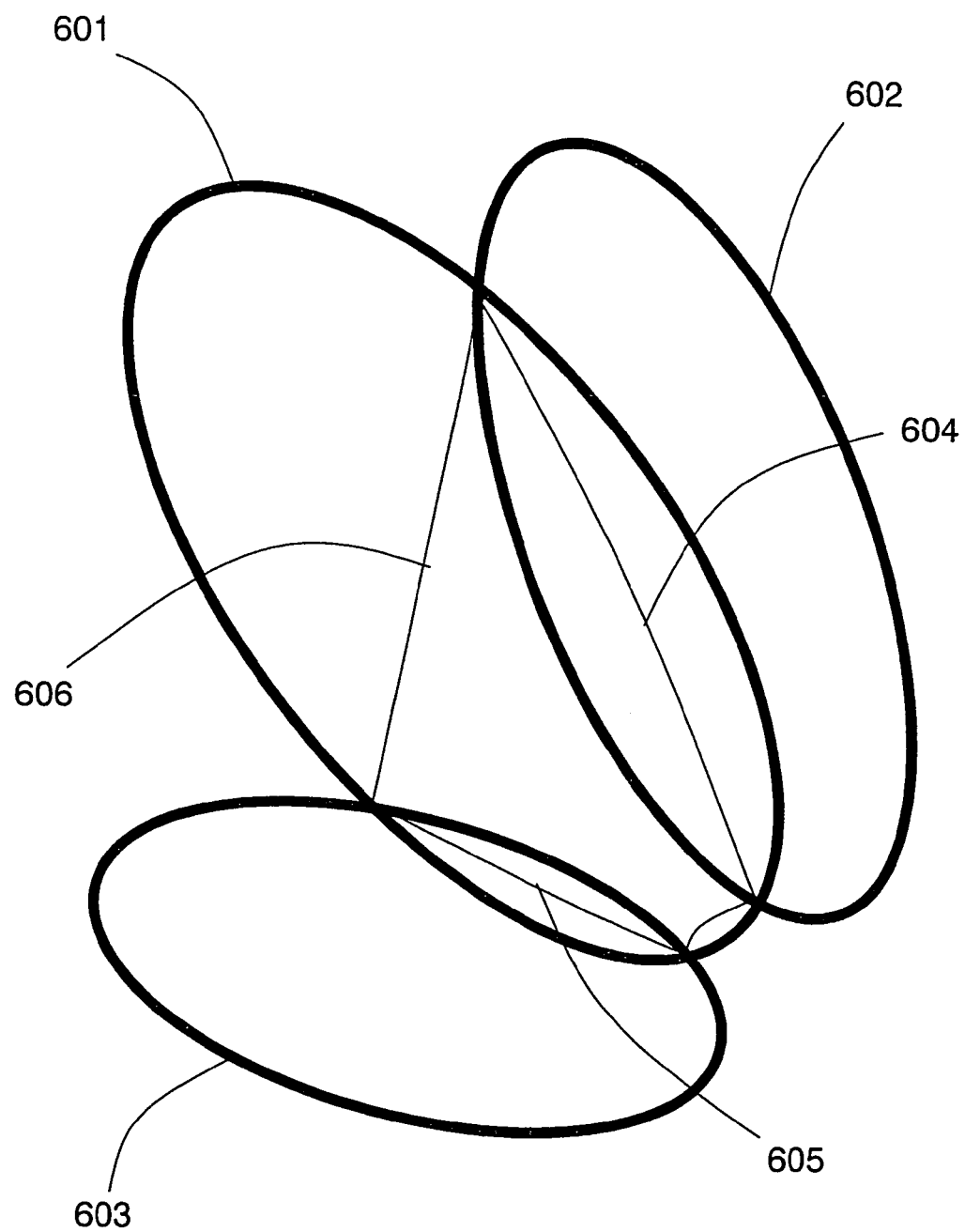
FIG. 6 illustrates a relation between intersection lines of MacAdam's chromaticity diagram and boundary lines of Kelly's color region.

FIG. 6 illustrates a relation between intersection lines of MacAdam's chromaticity diagram and boundary lines of Kelly's color region. In FIG. 6, oval 601 indicates a group of color which is perceived 'green'. Oval 602 indicates a group of 'yellowish green' and oval 603 indicates 'bluish green'.

Boundary line 604 indicates a boundary between 'green' and 'yellowish green', and boundary line 605 indicates a boundary between 'green' and 'bluish green'. Boundary line 606 indicates a limit of the CRT display's displayable colors, and color regions above the boundary are not displayable by the CRT display.

Based on those premises, the color-information-exchanging-device in accordance with the first embodiment is described hereinafter. In this case, the CRT display and the print have the same reference white, namely, the case where colorimetric mapping should be performed.

Figure 7:
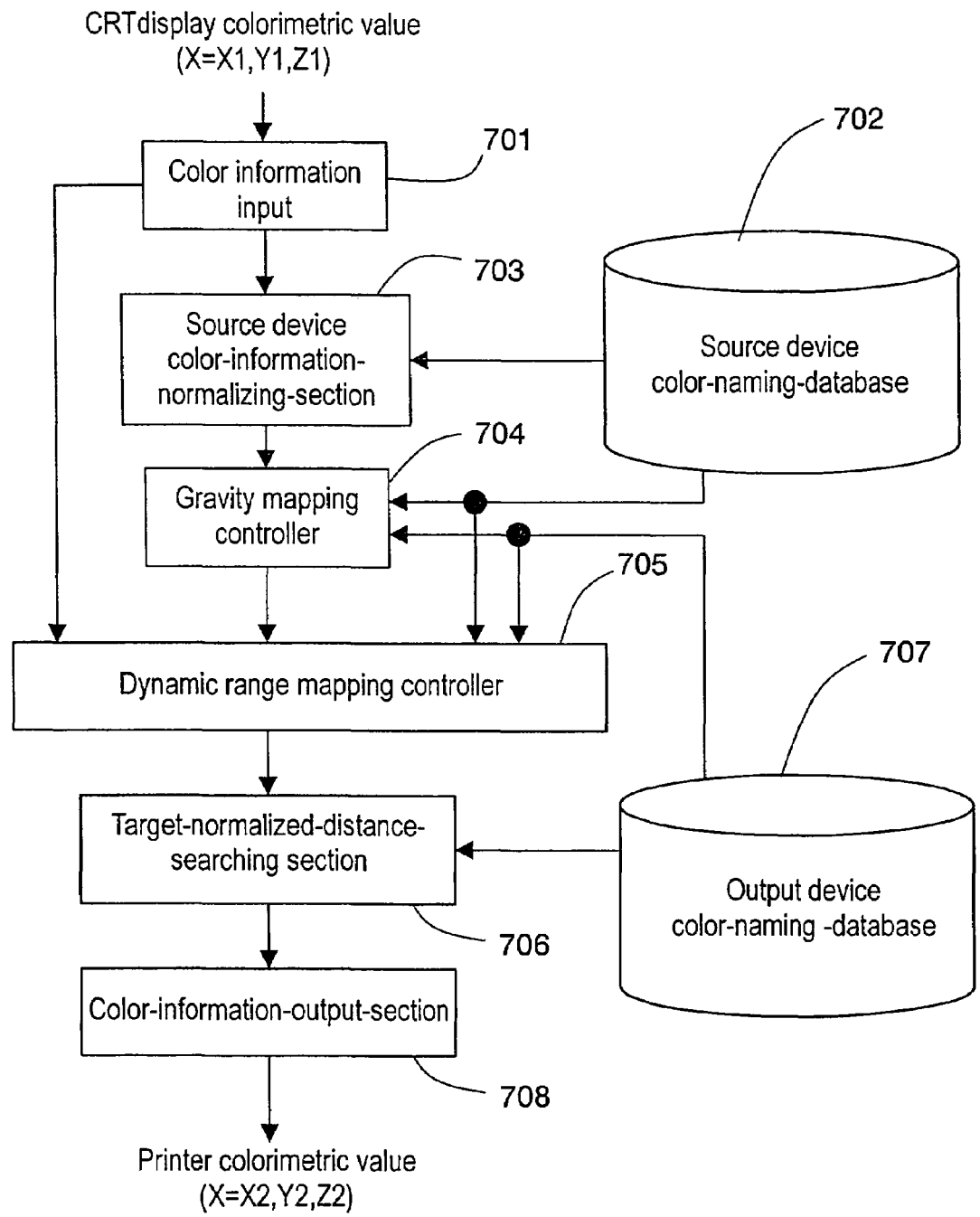
FIG. 7 illustrates an inside structure of color-information-exchanging-device in accordance with the first exemplary embodiment of the present invention.

FIG. 7 is a block diagram of the color-information-exchanging-device in accordance with the first exemplary embodiment of the present invention.

In FIG. 7, color-information-exchanging-device 701 outputs colorimetric value of the color displayed on the CRT display as the colorimetric value of the CRT display. Color-naming-database 702 for the source device stores (a) a colorimetric value of the color name selected among the colors displayed on the CRT display by at least one viewer, (b) gravity vector of each color calculated from the colorimetric values, and (c) variance covariance matrix calculated from the colorimetric values and expressing an extension of a color category of each color. Color-information-normalizing-section 703 for the source device reads out colorimetric values of respective colors from database 702, calculates gravity vectors and variance covariance matrixes of respective colors, and stores the resultant calculations into database 702. At the same time, normalizing section 703 calculates a normalized distance between the CRT display's colorimetric value and the gravity vector based on the variance-covariance matrix and gravity vector. The normalized distance undergoes gravity mapping controller 704 and dynamic range mapping controller 705 and is converted to a target normalized distance, and then is fed into target-normalized-distance-searching section 706.

Color-naming-database 707 for the output device stores (a) a colorimetric value of the color name selected among the colors printed by the printer by at least one viewer, (b) a gravity vector of each color calculated from the colorimetric values, and (c) a variance covariance matrix calculated from the colorimetric values and expressing an extension of a color category of each color.

Target-normalized-distance-searching section 706 reads out colorimetric values of respective colors from database 707, calculates gravity vectors and variance covariance matrixes of respective colors, and stores the resultant calculations in database 707. At the same time, searching-section 706 calculates a normalized distance between candidate colors for outputting and the gravity vector in the printer's color space, then finds a colorimetric value having a target normalized distance, and outputs the resultant values to color-information-output-section 708.

Color-information-output-section 708 outputs the resultant colorimetric value as the printer's colorimetric value.

Next, a calculation method to find a normalized distance of color-information-normalizing-section 703 for the source device is detailed.

A color category can be shaped in an oval configuration as discussed previously; thus, a distance between the color categories is expressed with a normalized distance. The normalized distance Di is found through the following equation:

$$D_i = \sqrt{(X - \mu_i)\Sigma_i^{-1}(X - \mu_i)} \quad (1)$$

where X=color vector;
$\mu i$=gravity vector of color category 'i';
$\Sigma i$=variance covariance matrix of color category 'i';
$\Sigma i^{-1}$=inverse matrix of the variance covariance matrix $\Sigma i$; and
Di=colorimetric distance from the gravity of the color category 'i' to color vector X, and a distance normalized by $\Sigma i$ expressing an extension of a color data group of color category 'i'.

In CIELAB color space, X, $\mu i$ and $\Sigma i$ are denoted as follows.

$$X = [x_1 x_2 x_3]^t \quad (2)$$

$$\mu i = [\mu_1 \mu_2 \mu_3]^t \quad (3)$$

$$\sum_i = \begin{bmatrix} S_{11} & S_{12} & S_{13} \\ S_{21} & S_{22} & S_{23} \\ S_{31} & S_{32} & S_{33} \end{bmatrix} \quad (4)$$

$$= \begin{bmatrix} \frac{1}{n-1}\sum_{i=1}^{n}(X_{1_i} - \mu_1)^2 & \frac{1}{n-1}\sum_{i=1}^{n}(X_{1_i} - \mu_1)(X_{2_i} - \mu_2) & \frac{1}{n-1}\sum_{i=1}^{n}(X_{1_i} - \mu_1)(X_{3_i} - \mu_1) \\ \frac{1}{n-1}\sum_{i=1}^{n}(X_{2_i} - \mu_2)(X_{1_i} - \mu_1) & \frac{1}{n-1}\sum_{i=1}^{n}(X_{2_i} - \mu_1)^2 & \frac{1}{n-1}\sum_{i=1}^{n}(X_{2_i} - \mu_2)(X_{3_i} - \mu_3) \\ \frac{1}{n-1}\sum_{i=1}^{n}(X_{2_i} - \mu_2)(X_{1_i} - \mu_1) & \frac{1}{n-1}\sum_{i=1}^{n}(X_{3_i} - \mu_3)(X_{2_i} - \mu_2) & \frac{1}{n-1}\sum_{i=1}^{n}(X_{3_i} - \mu_3)^2 \end{bmatrix}$$

where 'n' stands for a number of elements of a group of color signals. When 'q' pieces of color names are used for color naming, color vector X is to have 'q' pieces of normalized distances. 'S' stands for extensions of a color category's distribution in the directions of 'L', 'a' and 'b'.

The normalized distance includes the extension of a color category, thus it is presumable that a viewer perceives color-vector X to be which color.

In other words, when the normalized distance between color vector X and color category 'red' is smaller than that between color vector X and color category 'pink', it might be determined that the viewer perceives color vector X to be 'red' rather than 'pink'.

Euclidean distance in the CIELAB space is used to calculate a distance between the gravity of color category 'i' and color-vector X; however, as shown in FIG. 3, color category 'red' has a smaller distribution area than color category 'pink'. In such a case, because this method does not consider an extension of a color category, the color category 'red' would be underestimated if this method is directly used for comparing the distances. As a matter of course, a relation between the distance and the viewer's color categorical perception does not match.

On the other hand, the normalized distance absorbs the three-dimensional extension difference of color category with the variance covariance matrix, and the relation between the distance and the viewer's color categorical perception matches well. This is an advantage of using the normalized distance.

Next, gravity mapping controller 704 shown in FIG. 7 is detailed.

Figure 8:
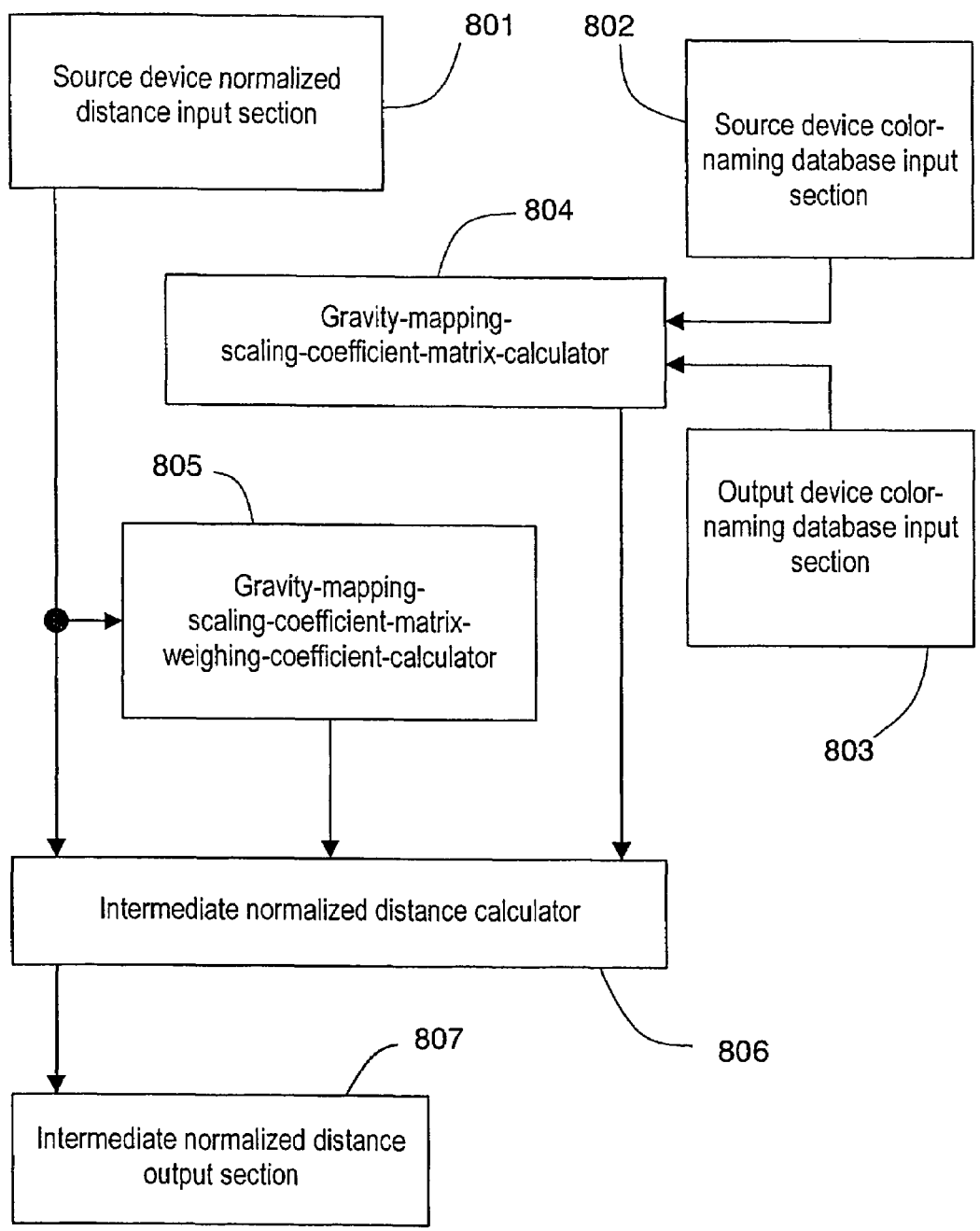
FIG. 8 illustrates an inside structure of gravity mapping controller in accordance with the first exemplary embodiment of the present invention.

FIG. 8 illustrates an internal structure of gravity mapping controller 704 in accordance with the first embodiment of the present invention.

In FIG. 8, normalized distance input section 801 for the source device outputs a normalized distance.

Color-naming database input section 802 for the source device outputs (a) each colorimetric value of respective colors 702 for the source device, (b) a gravity vector, and (c) a variance covariance matrix, all of which are stored in database 702. Color naming database input section 803 for the output device outputs (a) each colorimetric value of respective colors for the output device, (b) a gravity vector, and (c) a variance-covariance matrix, all of which are stored in database 707.

Gravity-mapping-scaling-coefficient-matrix-calculator 804 calculates a gravity-mapping-scaling-coefficient-matrix by using the gravity vector and variance covariance matrix of database input sections 802 and 803.

Weighing-coefficient-calculator 805 for the gravity-mapping-scaling-coefficient-matrix calculates a weighing-coefficient which weighs a gravity mapping scaling coefficient of each color category based on the normalized distance of the source device's color.

Intermediate normalized distance calculator 806 converts the normalized distance of the colorimetric value of the CRT display into an intermediate normalized distance by using (a) gravity-mapping-scaling-coefficient-matrix, i.e., an output from gravity-mapping-scaling-coefficient-matrix-calculator 804, and (b) the weighing coefficient for the gravity-mapping-scaling-coefficient-matrix, i.e., an output from weighing-coefficient-calculator 805.

Calculator 806 outputs the intermediate normalized distance to dynamic-range-mapping controller 705 shown in FIG. 7 via intermediate normalized distance output section 807.

Next, dynamic-range-mapping controller 705 shown in FIG. 7 is detailed.

Figure 9:
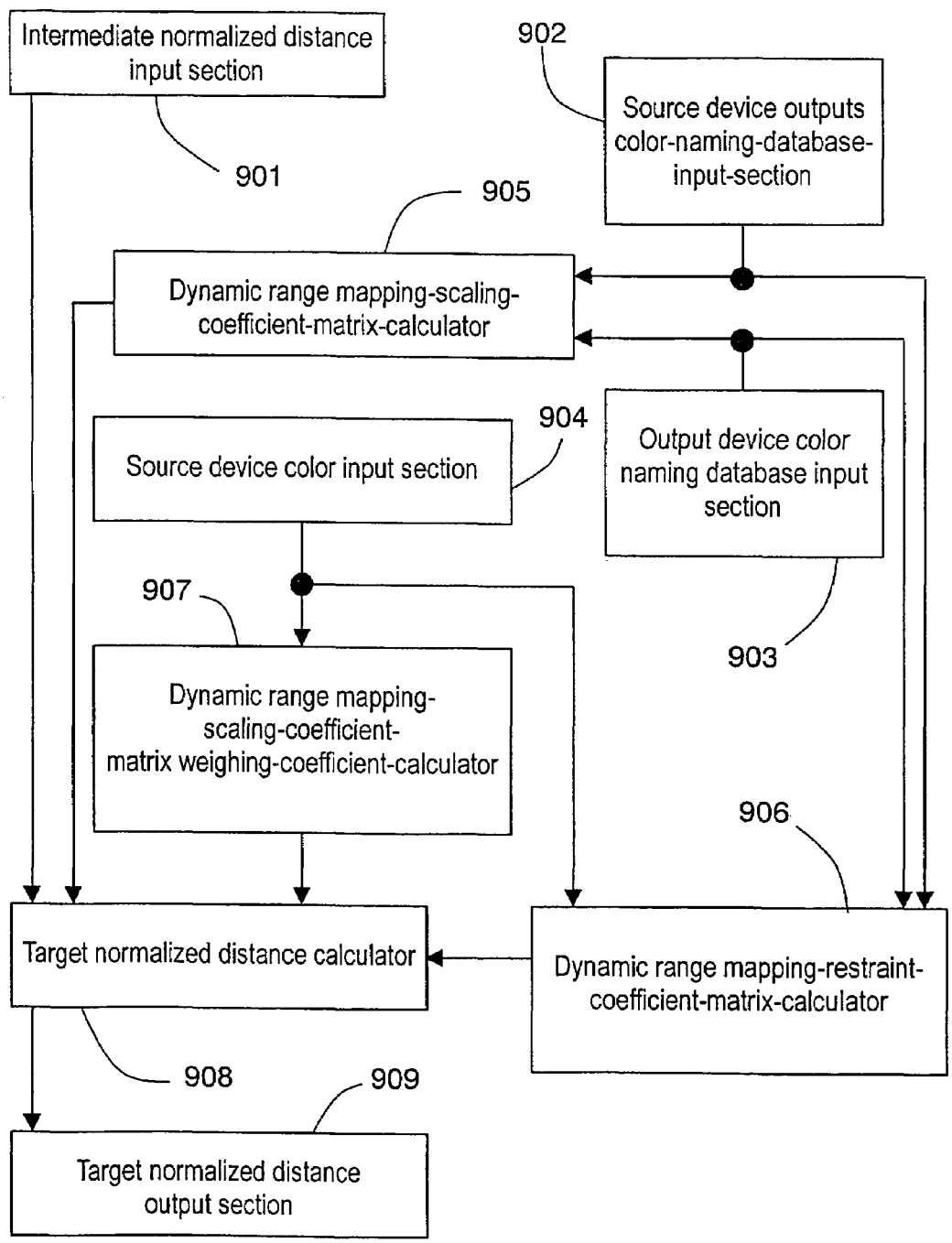
FIG. 9 illustrates an inside structure of a dynamic range mapping controller in accordance with the first exemplary embodiment of the present invention.

FIG. 9 illustrates an internal structure of a dynamic range mapping controller 705 in accordance with the first embodiment of the present invention.

In FIG. 9, intermediate normalized distance input section 901 outputs the intermediate normalized distance.

Color-naming-database-input-section 902 for the source device outputs (a) each colorimetric value of respective colors for the source device, (b) a gravity vector, and (c) a variance covariance matrix, all of which are stored in database 702. Color naming database input section 903 for the output device outputs (a) each colorimetric value of respective colors for the output device, (b) a gravity vector, and (c) a variance covariance matrix, all of which are stored in database 707. Source device's color input section 904 outputs the colorimetric value of the CRT display's color.

Dynamic range mapping scaling coefficient matrix calculator 905 calculates a dynamic-range-mapping-scaling-coefficient-matrix by using (a) the gravity vector and the variance covariance matrix, both supplied from color-naming-database input section 902 for the source device, and (b) the gravity vector and the variance covariance matrix, both supplied from color-naming-database input section 903 for the output device.

On the other hand, dynamic range mapping restraint coefficient calculator 906 calculates a dynamic range mapping restraint coefficient by using (a) the gravity vector, (b) the variance covariance matrix of input sections 902 and 903, and (c) the colorimetric value of the CRT display's color.

Weighing coefficient calculator 907 for the dynamic-range-mapping-scaling-coefficient-matrix calculates a weighing coefficient for the dynamic-range-mapping-scaling-coefficient-matrix by using the colorimetric value of the CRT display's color.

Target normalized distance calculator 908 receives the intermediate normalized distance from input section 901, and converts the received distance to a target normalized distance by using the dynamic-range-mapping-scaling-coefficient-matrix weighing coefficient.

Target normalized distance output section 909 outputs the target normalized distance to target-normalized-distance-searching-section 706 shown in FIG. 7.

Away of producing database 702 for the source device or database 707 for the output device is described with reference to FIG. 10.

Figure 10:
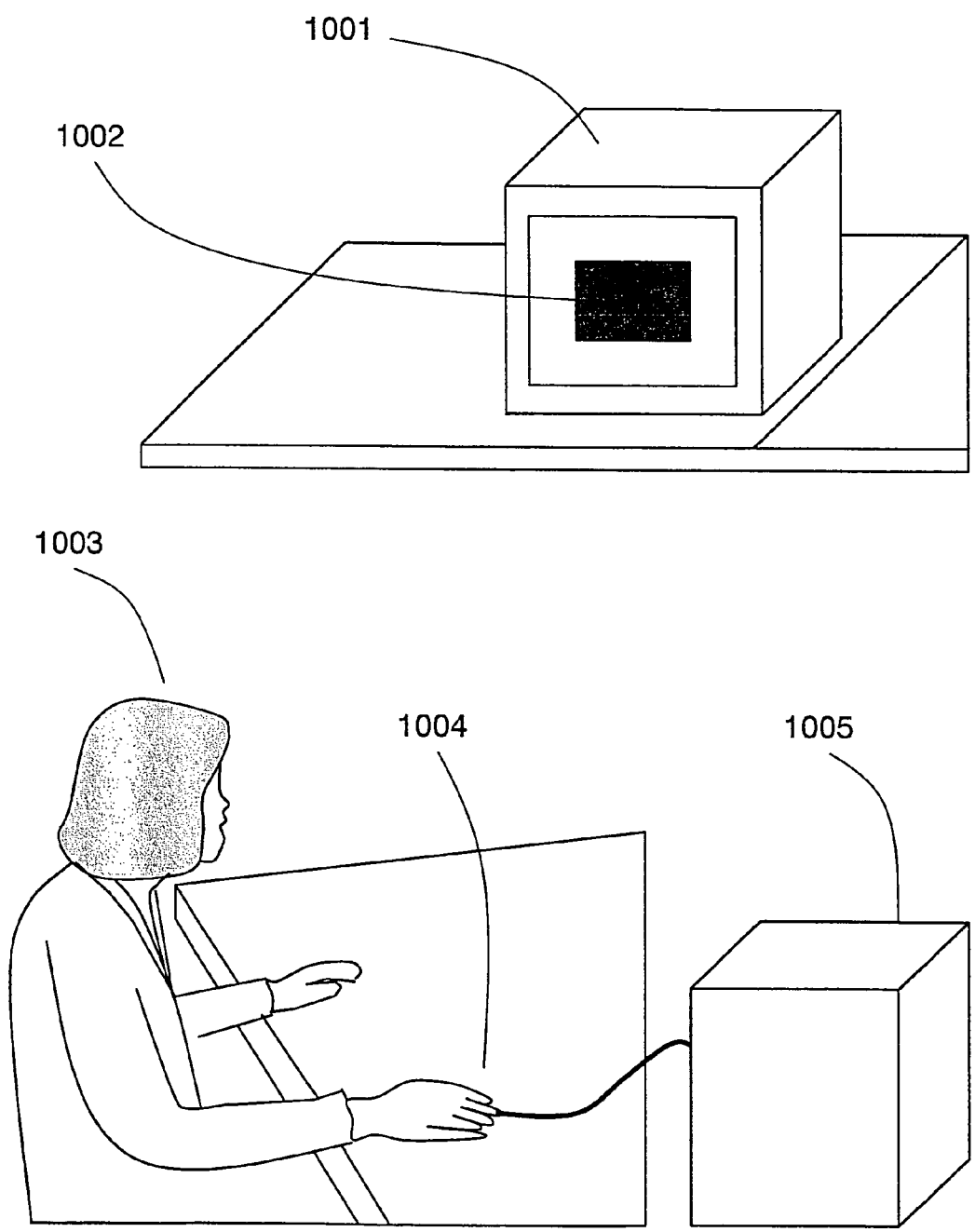
FIG. 10 illustrates a system used in an experiment of color naming.

FIG. 10 shows a color-naming experimental system.

In FIG. 10, on the CRT display or on a paper 1001 of the printer, at least one color patch 1002 for test stimulus is rendered; the colorimetric values of color patch 1002 have been measured. Viewer 1003 watches this color patch and names the colors with a plurality of color names. To be more specific, the color names to be selected by the viewer are rendered on the CRT display or on the paper 1001 by the printer. The selected color names of color patch 1002 are input with mouse 1004 into calculator 1005. Instead of the mouse, voice recognition can be used for the input. The number of viewers is not necessarily one, but may be plural.

When color patch 1002 is displayed on CRT display 1001, calculator 1005 stores the colorimetric values of color patch 1002—corresponding to the color names input with mouse 1004 by the viewer-into color-naming-database 702 for the source device. Instead of the colorimetric values, device-drive-levels can be stored.

When color patch 1002 is printed on a paper sheet, calculator 1005 stores the colorimetric values of color patch 1002—corresponding to the color names input with mouse 1004 by the viewer—into color-naming-database 707 for the output device. Instead of the colorimetric values, device-drive-levels can be stored.

It is effective to select a color name for the color naming responsive to an objective of color reproduction. For instance, when color categorical characteristics should be described regarding an entire color space of an image device, the basic 11 color category names found by Berlin and Kay are recommended. (Re: basic color category names, reference document: "Basic Color Terms, Their Universality and Evolution", Univ. of California Press, Berkley, 1969).

Nearly 100 languages were studied, and it has been found that all developed languages commonly share these 11 basic categorical color names.

Crawford summarizes a definition of the basic color names as follows: (reference document: "Defining Basic Color Terms", Anthropol Linguist, p 24, p 338–343, 1982)

1. The basic color names must be included in every language.
2. The basic color names are independent of users as well as cases, and they must be used in a stable manner.
3. The meaning of the basic color name is not included in other words.
4. The basic color names must be used for a specific object.

Uchikawa introduces 11 basic color categorical names in Japanese. (reference document: "Perception and Memorizing of Categorical Colors", the 7th Color Engineering Conference, 1990) If such basic categorical color names are used, color names can be selected with respect to the entire color space of an image device without overs and shorts.

One of the critical factors for determining color reproducibility is 'memorized colors'. When mapping control of the memorized colors is used as an important tool, it is effective to use the memorized colors as color names. Setting color names indicates geometrically that a gravity is set in a color space. Therefore, when the memorized color such as 'sky blue' or 'grass green' is used as a color name, it is expected that the color reproducibility is improved because mapping points are controlled based on the memorized color, which is critical for color reproduction.

When the viewer uses a color name—perceived at watching a test image—for the color naming, an appropriate color-information can be exchanged free from loss compared with a case where an entire gamut of the device is collected, because the mapping can be controlled to place some weight on an image gamut.

Categorical basic colors, memorized colors and the colors perceived by a viewer are respectively used for the color naming. Effectiveness of the respective cases is discussed above. Proper color categories other than the above also can be set.

The mapping process to the printer's color space while preserving the color categorical characteristics of the CRT display's color space is detailed hereinafter with reference to FIG. 11.

Figure 11:
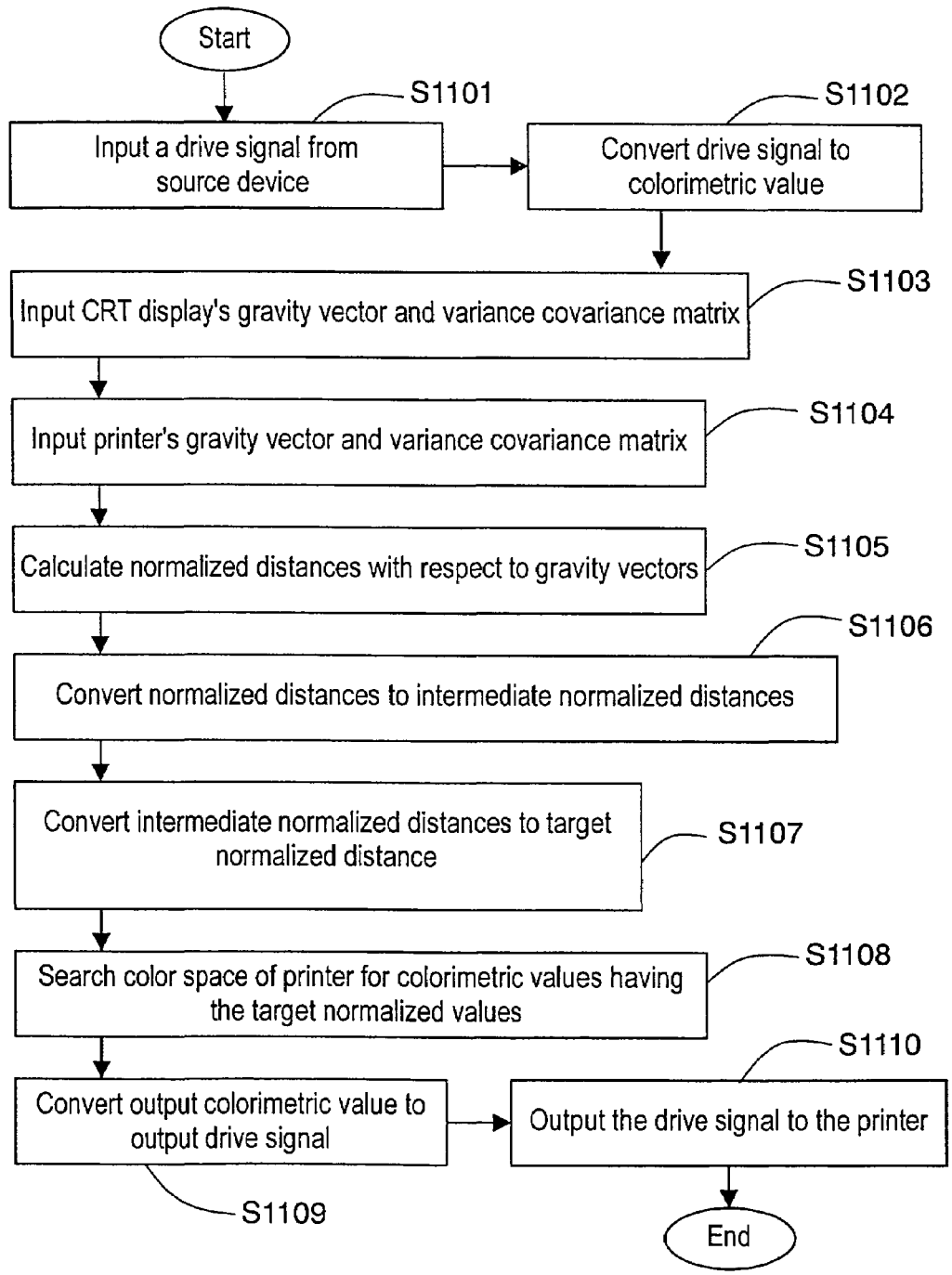
FIG. 11 shows a procedure of mapping into printer's space with preserving color categorical characteristics of the color space of a CRT display.

FIG. 11 shows a procedure of mapping into printer's space while preserving color categorical characteristics of the color space of a CRT display.

In this procedure, a number of color categories is 9 for convenience. (White, black and gray are deleted because they do not have chroma.)

In FIG. 11, the procedure starts by inputting a drive signal from CRT display driving unit 103 to the CRT display (source device) in step 1101, and then the drive signal is converted to the colorimetric value of an emitting color in step 1102.

In step 1103, CRT display's gravity vector $\mu_{s,i}$, and variance covariance matrix $\Sigma_{s,i}$ (both found by color naming) are input, and in step 1104 printer's gravity vector $\mu_{s,i}$, and variance-covariance matrix $\Sigma_{s,i}$, are input.

In step 1105 normalized distances with respect to the gravity vectors of the nine color categories are calculated with equation (1) using the CRT display's colorimetric value, gravity vector $\mu_{s,i}$, and variance covariance matrix $\Sigma_{s,i}$.

The nine normalized distances found in step 1105 are converted to intermediate normalized distances based on a positional relation between the CRT display's vector and the printer's vector in step 1106. Then, the intermediate normalized distances are converted to target normalized distance in step 1107 so that optimum points can be mapped by a dynamic range mapping operator based on mapping information on a surface control point provided on a gamut surface or near to the gamut surface.

Through the process in step 1107, the colors on the CRT display (source device) are mapped on the printer (output device) as nine normalized distances.

Then, in step 1108, the color space of the printer for the colorimetric values having the target normalized values are searched.

In step 1109, printer driving unit 105 calculates a drive level using a printer profile in order to print the colorimetric values searched, then outputs the drive signal to the printer in step 1110.

Next, the CRT display's normalized distance vector $D_s$ is converted to target normalized distance vector. $D_t$. This process is described with reference to the following equations. Equation (5) converts vector $D_s$ to vector $D_t$ with gravity mapping operator 'V' and dynamic mapping operator 'R'.

$$Dt = RVDs \Leftrightarrow \begin{bmatrix} D_{t,1} \\ D_{t,2} \\ \vdots \\ D_{t,9} \end{bmatrix} \tag{5}$$

$$= \begin{bmatrix} F+(1-F)U_1 & 0 & \cdots & 0 \\ 0 & F+(1-F)U_2 & \cdots & 0 \\ \vdots & \vdots & \ddots & \vdots \\ 0 & 0 & \cdots & F(1-F)U_9 \end{bmatrix}$$

$$\begin{bmatrix} V_1 & 0 & \cdots & 0 \\ 0 & V_2 & \vdots & 0 \\ \vdots & \vdots & \ddots & \vdots \\ 0 & 0 & \cdots & V_9 \end{bmatrix} \begin{bmatrix} D_{s,1} \\ D_{s,2} \\ \vdots \\ s_{t,9} \end{bmatrix} \Leftrightarrow D_t = RD_{b,t} \Leftrightarrow \begin{bmatrix} D_{t,1} \\ D_{t,2} \\ \vdots \\ D_{t,9} \end{bmatrix}$$

-continued $$= \begin{bmatrix} F+(1-F)U_1 & 0 & \cdots & 0 \\ 0 & F+(1-F)U_2 & \cdots & 0 \\ \vdots & \vdots & \ddots & \vdots \\ 0 & 0 & \cdots & F(1-F)U_9 \end{bmatrix} \begin{bmatrix} D_{b,t,1} \\ D_{b,t,2} \\ \vdots \\ D_{b,t,9} \end{bmatrix}$$

With gravity mapping operator 'V', vector $D_s$ is converted to distance vector $D_{b,t}$, namely the intermediate normalized vector.

The elements $V_1$, $V_2$, . . . , $V_9$ of the gravity mapping operator 'V' are extracted from equation (6).

$$\begin{bmatrix} V_1 \\ V_2 \\ \vdots \\ V_9 \end{bmatrix} = \begin{bmatrix} w_{v,1} \\ w_{v,2} \\ \vdots \\ w_{v,9} \end{bmatrix} \tag{6}$$

$$= w_{v,1}\begin{bmatrix} v_{11} \\ v_{21} \\ \vdots \\ v_{91} \end{bmatrix} + w_{v,2}\begin{bmatrix} v_{12} \\ v_{22} \\ \vdots \\ v_{92} \end{bmatrix} + \cdots + w_{v,9}\begin{bmatrix} v_{19} \\ v_{29} \\ \vdots \\ v_{99} \end{bmatrix}$$

where Φ is referred to as a gravity mapping scaling coefficient matrix, and this is extracted from equation (7). Also $[w_{v,1}, w_{v,2}, \ldots, w_{v,9}]^t$ are the weighing vectors for the gravity mapping scaling coefficients, and each element is extracted from equation (8).

$$\phi = \begin{bmatrix} v_{11} & v_{12} & \cdots & v_{19} \\ v_{21} & v_{22} & \cdots & v_{29} \\ \vdots & \vdots & \ddots & \vdots \\ v_{91} & v_{92} & \cdots & v_{99} \end{bmatrix} \tag{7}$$

$$v_{lm} = \begin{cases} \dfrac{N_{d,jm}}{N_{s,jm}} & (l \neq m) \\ 0 & (l = m) \end{cases} \quad l, m = 1, 2, \cdots, 9$$

$$w_{v,j} = \dfrac{\dfrac{1}{D_{s,i}}}{\sum_{j=1}^{9} \dfrac{1}{D_{s,j}}} \tag{8}$$

if $D_{s,i} = 0$ then $w_{v,i} = 1$, $w_{v,k \neq i} = 0$ if $D_{s,k \neq i} = 0$ then $w_{v,k \neq i} = 1$, $w_{v,l \neq i}$ Gravity mapping scaling coefficient matrix Φ is an operator for mapping the CRT display's gravity to the gravity of the same color category of the printer. Geometrically, this matrix rearranges the positional relations between nine gravities of the CRT display to those of the printer.

Element $v_{lm}$ of gravity mapping scaling coefficient matrix Φ is a scaling coefficient converting normalized distance $D_{s,lm}$ to another normalized distance $D_{d,lm}$. $D_{s,lm}$ is the normalized distance viewed from the gravity of color category 'l' toward the gravity of color category 'm' in the color space of the CRT display, and $D_{d,lm}$ is another normalized distance viewed from the gravity of color category 'l' toward the gravity of color category 'm' in the color space of the printer. Gravity mapping scaling coefficient matrix Φ includes all scaling coefficients corresponding to every possible combination of the nine color categories, therefore, all the gravity vectors in the CRT display's color space are mapped at the points of gravity of the same color category in the printer's color space. However, as equation (7) shows, the scaling coefficient ($v_{ll}, \ldots v_{mm}$) for itself is zero (0).

Gravity mapping for other than the gravity is carried out by interpolating the mapping information which the gravity has, responsive to the positional relation between color vector X and gravity vector $\mu$.

In equation (6), column vector elements [$v_{1i}, v_{2i}, \ldots v_{9i}$] of gravity mapping scaling coefficient matrix $\Phi$ are the scaling coefficients realizing the mapping between gravities in color category 'i', and they are weighed by weighing coefficient $w_{v,i}$. As shown in equation (8), weighing coefficient $w_{v,i}$ is defined by B/A, where 'A' represents the sum of inverses of the normalized distances between the color vector X and the gravities of nine color categories, and 'B' represents the inverse of the normalized distances between the color vector X and the gravities of color category 'i'. Accordingly, the gravity of the color category nearer to color vector X has a more important scaling coefficient, and the gravity of the color category farther from color vector X has a less important scaling coefficient.

As discussed above, gravity mapping operator 'V' is extracted from equations (6), (7) and (8), and operator 'V' converts the CRT display's normalized distance $D_s$ to intermediate normalized distance $D_{b,t}$.

In equation (5), dynamic range mapping operator 'R' converts intermediate normalized distance vector $D_{b,t}$ into target normalized distance vector $D_t$. The function of operator 'R' is to incorporate the difference in gamut shapes between the CRT display (source device) and the printer (output device) into the intermediate normalized distance vector $D_{b,t}$ which only underwent the mapping between the gravities by operator 'V'. This process corresponds to a dynamic range mapping.

Operator 'R', as shown in equation (5), comprises dynamic range correction coefficient $U_i$—making the dynamic range of the source device correspond to that of the output device—and restraint coefficient F which restrains the work of coefficient $U_i$.

First, coefficient $U_i$ is detailed hereinafter.

In order to design dynamic range correction coefficient $U_i$, a surface control point must be defined. The surface control point is disposed on a surface of the device's gamut or near to the surface of the gamut. The point functions as a mapping target of the dynamic range mapping.

In this embodiment, for an easy description, eight surface control points are defined; however, a number of the control points can be set arbitrarily.

The eight surface control points are defined in digital counts of the device as follows: the primary color: red R: ($d_r, d_g, d_b$)=(255, 0, 0), green G: ($d_r, d_g, d_b$)=(0, 255, 0), and blue B: ($d_r, d_g, d_b$)=(0, 0, 255). Secondary colors: yellow Y: ($d_r, d_g, d_b$)=(255, 255, 0), magenta M: ($d_r, d_g, d_b$)=(255, 0, 255), cyan C: ($d_r, d_g, d_b$)=(0, 255, 255), white W: ($d_r, d_g, d_b$)=(255, 255, 255), black B: ($d_r, d_g, d_b$)=(0, 0, 0). These eight points are positioned at respective vertexes of the device's eight gamuts, and on the surface of the gamuts. These surface control points are set both on the CRT display and the printer, and the mapping is carried out between the control points of the same color. This is done by dynamic range correction coefficients $U_i$. Therefore, coefficient $U_i$ functions as mapping again the surface control points of the CRT display onto the surface control points of the printer. The control points of the CRT display have been once mapped on the CRT display by gravity mapping operator 'V'.

Coefficient $U_i$ is extracted from equation (9).

$$\begin{bmatrix} U_1 \\ U_2 \\ \vdots \\ U_9 \end{bmatrix} = \Psi \begin{bmatrix} w_{r,1} \\ w_{r,2} \\ \vdots \\ w_{r,9} \end{bmatrix} \quad (9)$$

$$= w_{r,1} \begin{bmatrix} \psi_{11} \\ \psi_{21} \\ \vdots \\ \psi_{91} \end{bmatrix} + w_{v,2} \begin{bmatrix} \psi_{12} \\ \psi_{22} \\ \vdots \\ \psi_{92} \end{bmatrix} + \cdots + w_{v,8} \begin{bmatrix} \psi_{18} \\ \psi_{28} \\ \vdots \\ \psi_{98} \end{bmatrix}$$

where $\Psi$ is referred to as a dynamic range mapping scaling coefficient matrix and extracted from equation (10). Weighing vector [$w_{r,1}, w_{r,2}, \ldots w_{r,9}$] for the dynamic range mapping scaling coefficient is extracted from equation (11).

$$\Psi = \begin{bmatrix} \psi_{11} & \psi_{12} & \cdots & \psi_{18} \\ \psi_{21} & \psi_{22} & \cdots & \psi_{28} \\ \vdots & \vdots & \ddots & \vdots \\ \psi_{91} & \psi_{92} & \cdots & \psi_{28} \end{bmatrix} \quad (10)$$

$$\psi_{pq} = \frac{D_{d,a,c,pq}}{D_{d,a,b,pq}}, \; p = 1, 2, \cdots, 9 \; q = 1, 2, \cdots 8$$

$$w_{v,j} = \frac{\frac{1}{E_{s,a,i}}}{\sum_{j=1}^{8} \frac{1}{E_{s,a,j}}} \quad (11)$$

where 'p' represents a kind of the color categories and 'q' represents a kind of the surface control points.

Dynamic range mapping scaling coefficient matrix $\Psi$ is an operator that maps the surface control points of the CRT display onto the surface control points of the same color of the printer. This operator works in a manner geometrically equivalent to gravity mapping operator V that performs gravity-to-gravity mapping. In other words, matrix $\Psi$ rearranges the positional relations between eight surface control points of the CRT display to those of the printer. Element $\psi_{pq}$ of matrix $\Psi$ is a scaling coefficient that converts the CRT display's intermediate normalized distance $D_{d,a,b,pq}$ into the printer's intermediate normalized distance $D_{d,a,c,pq}$. Distance $D_{d,a\;b,pq}$ extends between the surface control point of color 'q' and the gravity of color category 'p' in the color space of the CRT display, and distance $D_{d,a,c,pq}$ extends between the surface control point of color 'q' and the gravity of color category 'p' in the color space of the printer. Matrix $\Psi$ includes all the scaling coefficients with respect to every combination of the nine color categories and the eight surface control points. However as equation (11) shows the scaling coefficient (p=q) for itself is zero (0).

Dynamic range mapping for other than the surface control points is carried out by interpolating the mapping information that the surface control point has, responsive to the positional relation between color vector X and surface control point. In equation (9), column vector elements [$\psi_{1i}, \psi_{2i}, \psi_{9i}$] of dynamic range mapping scaling coefficient matrix $\Psi$ are the coefficients which scale the intermediate normalized distance from gravity points in color category 'i' to the surface control points, and they are weighed by weighing coefficient $w_{r,i}$. As shown in equation (11), in the color space of the CRT display, weighing coefficient $w_{r,i}$ is defined by D/C, where 'C' represents the sum of inverses of the Euclidean distances in CIELAB space between the color vector X and the eight surface control points of color vector X, and 'D' represents the inverse of the Euclidean distances between the color vector X and the surface points of color category 'i'. Accordingly, the surface control point of the color category nearer to color vector X has more important scaling coefficient, and the surface control point of the color category farther from color vector X has less important scaling coefficient.

Now another element, i.e., restraint coefficient 'F', of dynamic range mapping operator 'R' is detailed hereinafter.

Dynamic range correction coefficient $U_i$ maps the surface control points of the CRT display (source device) onto the surface control points of the printer (output device). However, in this case, CRT display's gravities that were mapped onto the gravities of the printer by gravity mapping operator 'V' are again mapped by operator 'R', thereby moving to other places than the printer's gravities. If the design policy of mapping the gravities between the CRT display (source device) and the printer (output device) as well as mapping the surface control points therebetween is carried out, the color vector once mapped to the printer's gravity by operator 'V' must be controlled so as not to be affected by the mapping by operator 'R', so that the color vector does not move from the gravity.

If equation (5) is reconsidered, intermediate normalized distance vector $D_{b,t}$ converted by operator 'V' directly becomes target normalized distance vector $D_t$, when color vector X agrees with the gravity of the CRT display (source device).

Accordingly, correction coefficient $U_i$ should not work at all when color vector X agrees with the gravity of the CRT display (source device), but it should work to the maximum extent when color vector X agrees with the surface control point. In order to make coefficient $U_i$ work in such a way, the effect of coefficient $U_i$ must be weighed considering the positional relation between color vector. X and the gravity point of the CRT display (source device). Restraint coefficient 'F' will do this job, and coefficient 'F' is extracted from equation (12).

$$F = w_{m,1}f_1 + w_{m,2}f_2 + \ldots + w_{m,9}f_9 \tag{12}$$

where $f_i$ is given by equation (13) and $w_{m,i}$ is given by equation (14).

$$f_i = \frac{\frac{1}{E_{s,m,i}}}{\sum_{j=1}^{8} \frac{1}{E_{s,a,j}} + \frac{1}{E_{s,m,j}}} \tag{13}$$

if $E_{s,m,i} = 0$ then $f_i = 1$ $$w_{m,i} = \frac{\frac{1}{D_{s,m,i}}}{\sum_{j=1}^{9} \frac{1}{D_{s,m,j}}} \tag{14}$$

if $D_{s,m,j} = 0$ then $w_{m,i} = 1$, $w_{m,k \neq l} = 0$
if $D_{s,k \neq l} = 0$ then $w_{m,k \neq l} = 0$, $w_{m,l \neq i \neq k} = 0$ where $E_{s,m,i}$ represents Euclidean distance in the CIELAB space between gravity vector $\mu_i$ of color category 'i' and color vector X. $E_{s,a,i}$ represents Euclidean distance in the CIELAB space between surface control point 'i' and color vector X. Both of $E_{s,m,i}$ and $E_{s,a,i}$ indicate the distance in the source color space (color space of the CRT display). According to equation (13), '$f_i$' works as binding force to correction-coefficient Ui which is given by the gravity vector of color category 'i' to the eight surface control points. When $E_{s,m,i}=0$ namely color vector X agrees with gravity vector $\mu_i$, then $f_i$ becomes 1 and the maximum binding force is expected. On the contrary, when $E_{s,a,i}=0$, namely, the test color agrees with the surface control point, then $f_i$ becomes zero (0) and no binding force is expected.

On the other hand, in equation (14), $D_{s,m,i}$ represents the normalized distance between gravity vector $\mu_i$ of color category 'i' and color vector X. This distance is limited in the source color space. When color vector X agrees with gravity vector $\mu_i$, $w_{m,i}$ becomes 1 (one) and weighing coefficient $w_{m,k!=i}$ becomes zero (0). Therefore, $w_{m,i}$ functions as a weighing coefficient to binding force $f_i$ determined according to the position of color vector X. Respective binding forces '$f_i$' of the nine gravity vectors are weighed by $w_{m,i}$, and the results are reflected to restraint coefficient 'F'.

Through the process discussed above, the input colorimetric value of the CRT display is converted to the target normalized distance, and the mapping based on the normalized distance is completed.

Step 1108 shown in FIG. 11, i.e., the process to find a colorimetric value having the target normalized distance out of the values in the color space of the printer is detailed hereinafter.

Figure 12:
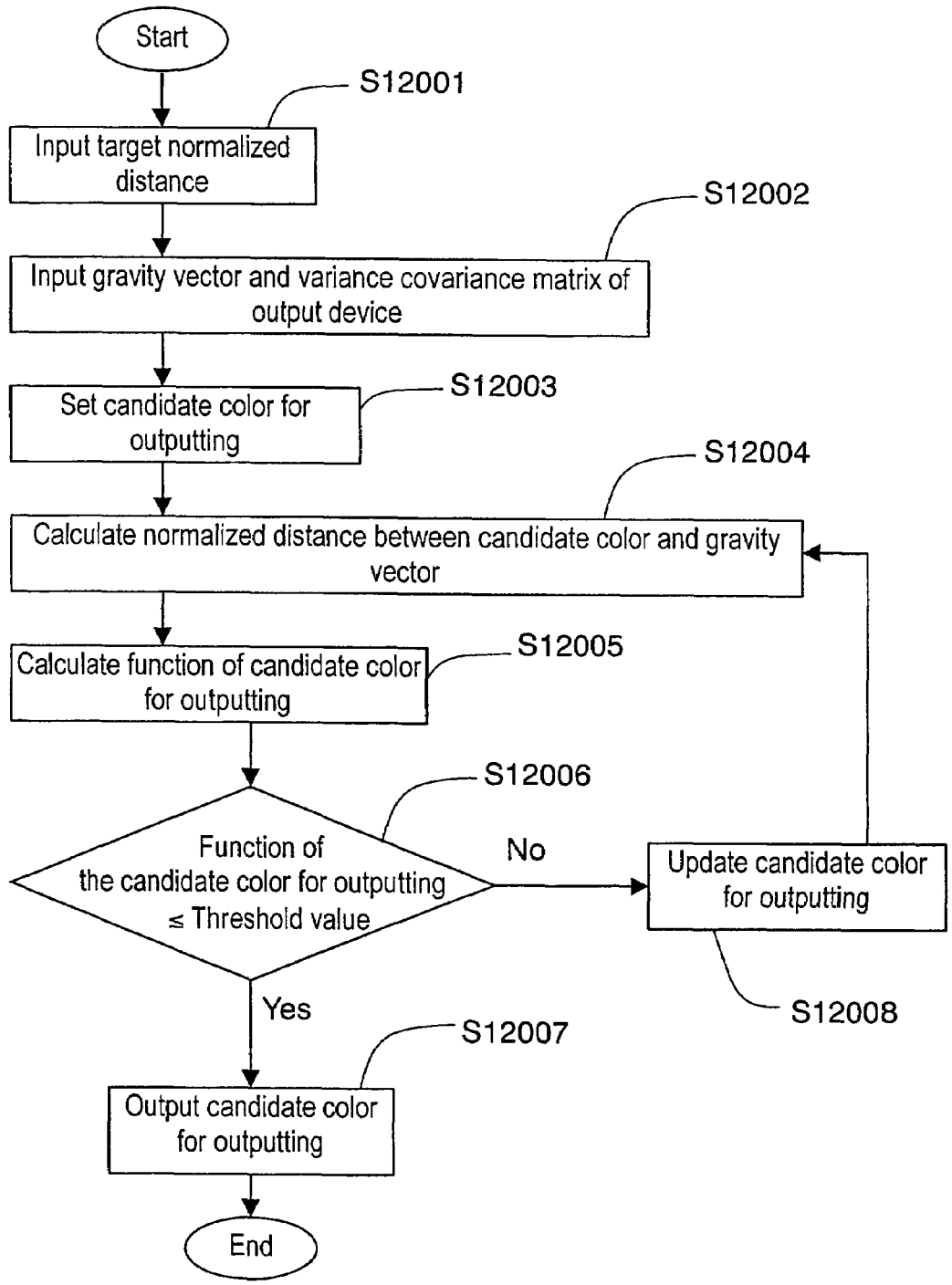
FIG. 12 shows a procedure of searching the color space of an output device for a colorimetric value having a target normalized distance.

FIG. 12 shows a procedure for searching the color space of the printer (output device) for a colorimetric value having the gravity vector and the target normalized distance.

Step 1108 begins with inputting the target normalized distance (step 12001).

Then in step 12002 the gravity vector and a variance covariance matrix of the printer (output device) are input, and then a candidate color is set for outputting in step 12003.

Step 12004 calculates the normalized distance between the candidate color and the gravity vector of the printer.

Step 12005 gives the normalized distance to a function of the candidate color for outputting, i.e. equation (15). Then step 12006 compares the function with a predetermined threshold value.

When the function shows a greater value than the threshold value, the candidate color is renewed in step 12008, and the process returns to step 12004. On the other hand, if the function shows a smaller value than the threshold value, the search is ended, and the candidate color is sent to the output device as an output colorimetric value. Then the process is completed in step 12007.

$$f(P_l) = \sqrt{\left(\frac{D_{t,1} - D_{p,1}}{D_{t,1}}\right)^2 + \left(\frac{D_{t,2} - D_{p,2}}{D_{t,2}}\right)^2 + \cdots + \left(\frac{D_{t,9} - D_{p,9}}{D_{t,9}}\right)^2} \tag{15}$$

where $D_{p,i}$ represents the normalized distance between the candidate color and the gravities of color category 'i'.

Meanwhile, the CMS needs to change its form following an objective of color reproduction. For instance, when colorimetric matching is the objective of the color reproduction, the CMS is optimized based on the reference that a source color agrees with an output color in terms of CIEXYZ value or CIELAB value. When a matching of color appearance is the objective of the color reproduction, the reference should be the agreement of the attributions of the source color and output color, where the attribution includes brightness and colorfulness in absolute term, and hue, lightness, chroma in relative term.

In a desirable color production, an agreement of memorized colors with reproduced color should be a key, and the color should be reproduced according to a viewer's perceptive color.

The first embodiment of the present invention can be selectively applied to a variety of color reproductions by using gravity-control points formed by gravity vectors as well as the surface control points disposed on gamut surfaces or near to the gamut surfaces.

In other words, when a vector agreeing with the source device is colorimetrically used at a control point of the output device, colorimetric matching is preserved between the control points of the source and output devices, so that the mapping intermingled with colorimetrical matching and preserving of categorical characteristics for gamut matching is realized.

In a section near to gray axis in the gamut, colorimetrical matching is realized, and on the gamut surface, a non-linear process due to gamut compression is realized. Colors have been excellently reproduced in that way in general. However, in the present invention, gravity control points in the gamut form colorimetrical-mapping-pair, and the surface control points form color-perception-mapping-pair (e.g. color appearance mapping), thus an ideal mapping process is realized.

If differences in color appearances are minimized on every control-points pair, a gamut mapping—considering chromatic adaptation due to a difference in lighting—can be designed, and a gamut mapping method to be optimized color categorically to an arbitrary viewing environment can be designed.

When the first embodiment does not accompany the gamut compression in mapping, it works as a color-information-exchanging-device that can realize a color appearance matching, i.e., predicting a corresponding color.

Specifying the color—of which color and appearance agreed with each other on a source device—on an output device requires a process where a viewer selects the color out of plural given colors.

When the color cannot be specified on the output device due to a different gamut of the source and output devices, a process is required where a color showing a minimum difference of appearance is searched.

Figure 13A:
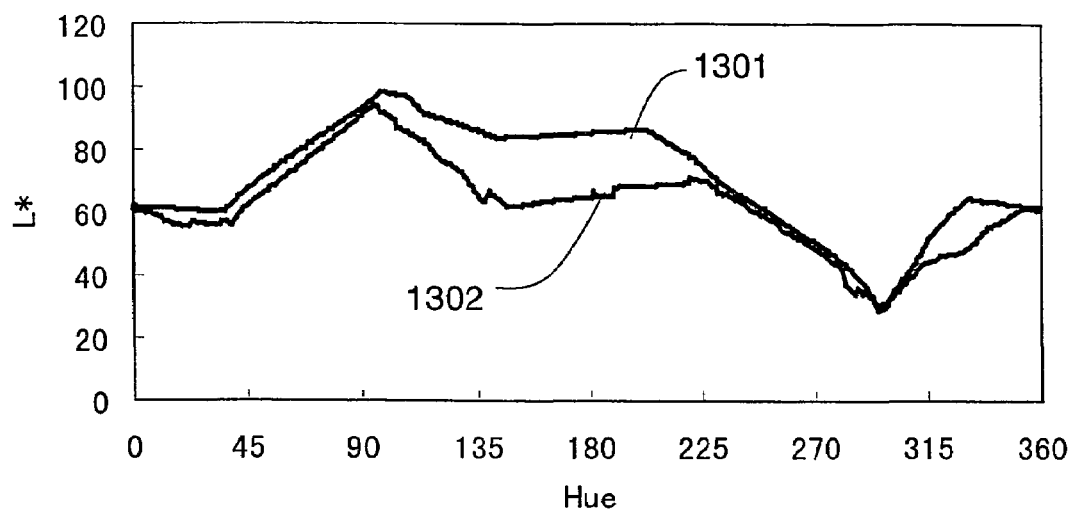
FIG. 13(a) shows a cusp of gamut of a source device and that of an output device.

FIG. 13(a) shows a cusp of the gamut of a source device and that of an output device. The horizontal axis represents hue, and the vertical axis represents lightness.

If the colors between cusp 1301 of the source device's gamut and cusp 1302 of the output device's gamut are used as test colors, the process discussed above can be finished in a short time.

Figure 13B:
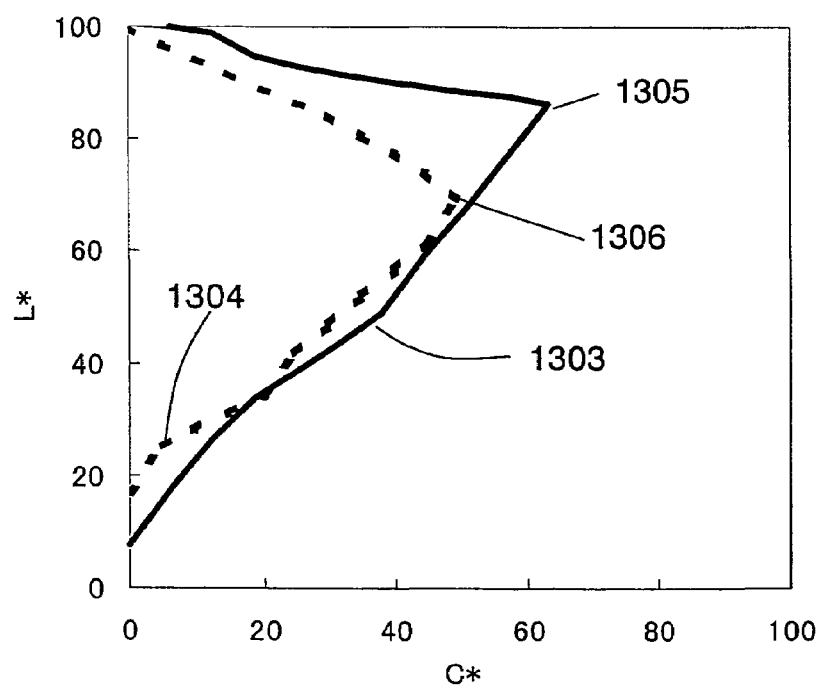
FIG. 13(b) shows gamut boundaries of the source device and output device, the boundaries are indicated by a plane of chroma C–lightness L.

FIG. 13(b) shows gamut boundaries 1303 and 1304 of the source device and output device respectively at hue angle of 200 degree, where the boundaries are indicated by a plane of chroma C*–lightness L*.

When a surface control point of the source device is disposed at cusp 1305 where the maximum chroma is rendered on gamut boundary 1303, the corresponding color having a minimum difference in appearance from the control point seems to be around cusp 1306 where the maximum chroma is rendered on gamut boundary 1304 of the output device.

If cusp 1306 per se is not selected, it is natural to think that a section nearer to the source device's cusp 1305, i.e., brighter section, can be selected rather than a section darker than cusp 1306. Accordingly, the color where the difference in color appearance is minimized is possibly between cusp 1301 and cusp 1302. Therefore, if the test colors are selected out of this region, the color which shows minimum difference in color appearance or agreement in color appearance can be searched within a short time.

As discussed above, the first embodiment proves that the gamut mapping, where color attributes and color reproducibility are quantatively understood, can be realized, and also a practical corresponding-color-prediction, absorbing the difference in viewing conditions, can be realized. The procedure discussed in the first embodiment is this: at least one viewer names colors, then the colors are grouped based on colorimetric values or device driving level of the test colors into color categories. Each color category is normalized by using statistical characteristics such as variance, so that normalized color space is provided. In this color space, control points of the same color name are mapped, so that a source device and an output device exchange color information. Through these procedures, the two features discussed above can be realized.

The first embodiment also proves that it can minimize the difference in respective impressions of an entire image on the source device and the output device through the following procedure: Classify the CIELAB color space of the source and output devices into a plurality of color categories, and produce normalized color spaces for the respective devices by using (a) a gravity vector calculated in each color category and (b) variance covariance matrixes expressing extension from the gravity points. Then, map the control points of the same color in the normalized color spaces of the respective devices, thereby exchanging the color information by preserving the agreement of the color categories in the two normalized color spaces as well as the sizes of color perception quantity such as chroma and the like in the two normalized color spaces.

Exemplary Embodiment 2

The color information exchanging device in accordance with the second exemplary embodiment is demonstrated hereinafter with reference to FIG. 1 and FIG. 14. This is the case where a CRT display and a print by a printer differ greatly in a reference white color; i.e., mapping color appearance is performed in this embodiment.

Figure 14:
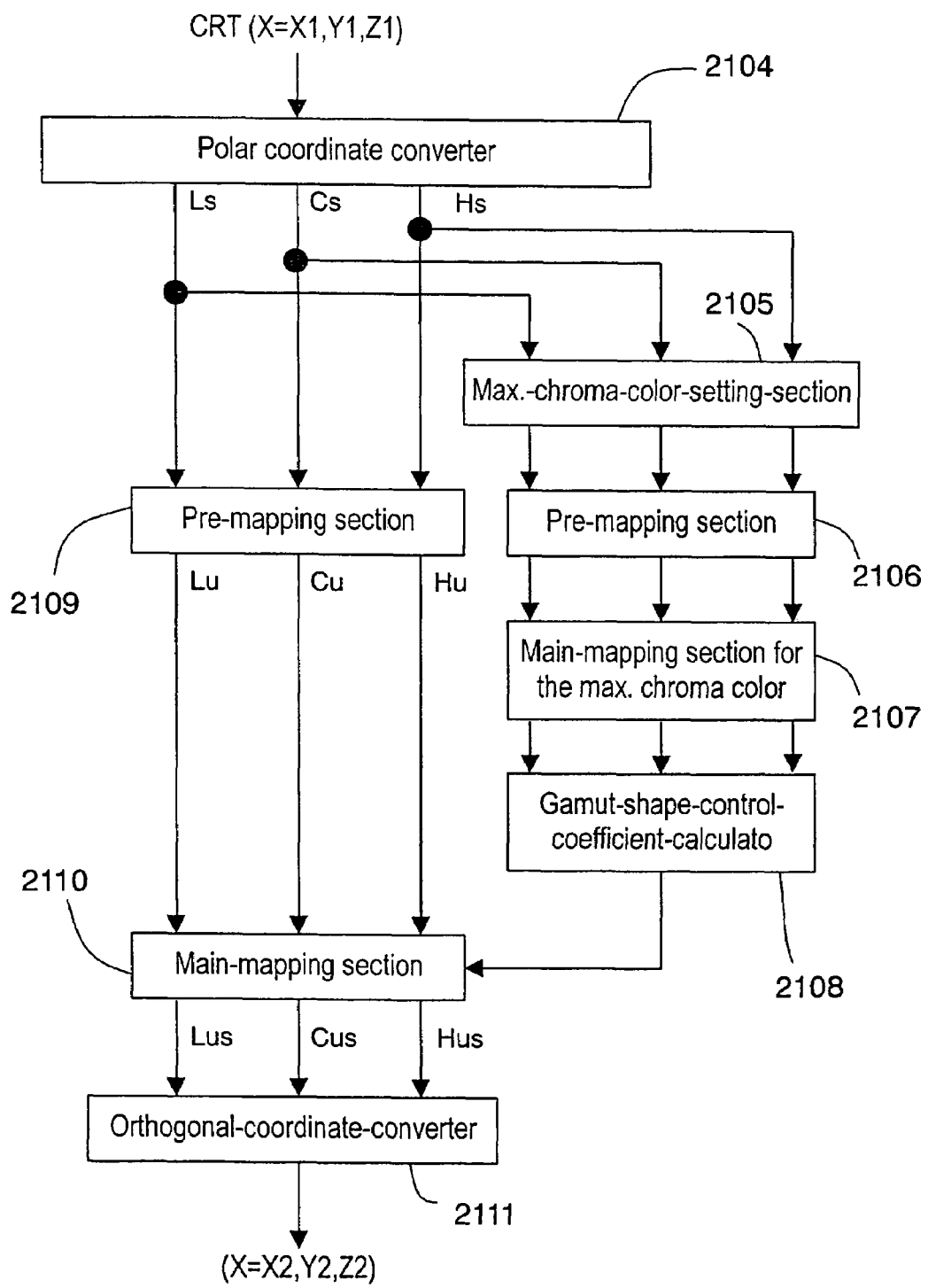
FIG. 14 is a block diagram of a color-information-exchanging-device in accordance with a second exemplary embodiment.

FIG. 14 illustrates an internal structure of the color information exchanging device used in the second embodiment.

In FIG. 1, CRT display driving unit 103 outputs the colorimetric values of the colors displayed on CRT display 102. These colorimetric values are converted to lightness, chroma, and hue, which are three attributes of human visual sight to the colors, by polar coordinate converter 2104 shown in FIG. 14, then the converted values are supplied to two systems.

One of the systems performs gamut mapping per se. In this system, gamut mapping employs pre-mapping section 2109 and main-mapping section 2110.

The other system is used for finding a gamut-shape-control-coefficient. In this system, the converted values are provided to max.-chroma-color-setting-section 2105 where the max. chroma of the colors on the CRT display is set on gamut boundary, pre-mapping section 2106 where the colors on the gamut boundary are mapped on gamut boundary of a print by the printer, main-mapping section 2107 for the max. chroma color, and gamut-shape-control-coefficient-calculator 2108 where an adjusting coefficient—allowing the gamut boundary of the CRT display to be mapped on the gamut boundary of the print—namely, the gamut shape control coefficient is calculated. This resultant coefficient is supplied to main-mapping section 2110 and used for main mapping. An output from main-mapping section 2110 is converted from lightness, chroma and hue in the polar coordinate into colorimetric values in an orthogonal-coordinate-converter 2111, then the resultant values are supplied to printer driving unit 105 shown in FIG. 1.

The processes in the pre-mapping and main-mapping are described in FIG. 15. FIG. 15 illustrates processes of the main-mapping and pre-mapping when lightness mapping from a CRT display to a printer is performed in accordance with the second exemplary embodiment of the present invention. Inside of gamut boundary 2201 is a gamut of the CRT display. Inside of gamut boundaries 2202 and 2205 are printer's gamut at hue $H_s$. Black point 2203 represents a color of the CRT display. Black points 2204 and 2207 are pre-mapped colors at hue $H_s$. Inside of gamut boundary 2206 is the printer's gamut at hue $H_d$, and black point 2208 represents a color by the printer at hue $H_d$.

At pre-mapping section 2109, gamut 2201 of the CRT display is once pre-mapped into printer's gamut 2202; then pre-mapped color 2207 at hue $H_s$ is mapped again at the position of black point 2208 in hue $H_d$ so that the color category of color 2203 of the CRT display can agree with the color category of printer color 2208.

Pre-mapping section 2109 has a function of mapping along a geometrical construction of a gamut, and main-mapping section 2110 has a function of maximizing the color reproducibility. However, when the main-mapping is performed, the geometrical construction of the printer's gamut must be obtained, so that the colors once delivered into the printer's gamut by the pre-mapping will not go out from the printer's gamut. Gamut-shape-control-coefficient calculator 2108 has a function of supplying information of gamut shape to main-mapping section 2110, and allows the printer colors determined by the main mapping to be situated in the printer's gamut.

Figure 16:
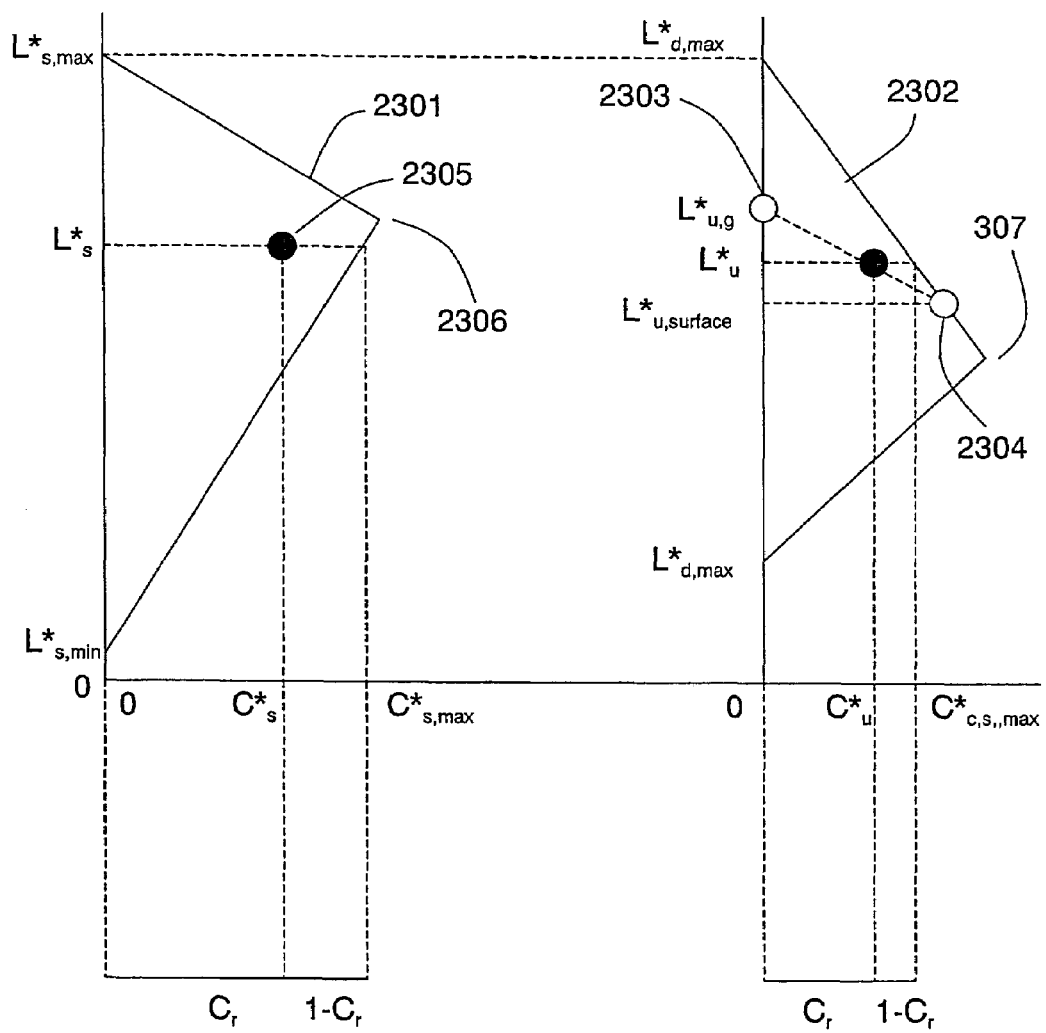
FIG. 16 shows cross sections of CRT display's gamut and printer's gamut.

The concept of the pre-mapping is described hereinafter with reference to FIG. 16. FIG. 16 is a cross section of color space defined by lightness L*, chroma C and hue H taken on line L*–C* at hue $H_s$ of an emitting color of the CRT display. The defined color space has been converted from the CIELAB by polar coordinate conversion. The left side on FIG. 16 is a cross section of CRT display's gamut, and inside of gamut boundary 2301 is a gamut of the CRT display. The right side is a cross section of printer's gamut. Inside of gamut boundary 2302 is printer's gamut.

Pre-mapping includes the following steps: first, determine white point 2303 on the lightness axis and white point 2304 on the gamut boundary, then put both white points 2303 and 2304 at a chromatic saturated point of the color on the CRT display, and finally, determine a pre-mapping point (represented by a black point). This is shown by equation (16).

The lightness $L^*_{u,g}$ of white point 2303 and the lightness $L^*_{u,\,surface}$ of white point 2304 are found in this way.

$$\begin{bmatrix} L^* \\ C^* \\ H \end{bmatrix}_H = \begin{bmatrix} (1-C_r)L^*_{u,s} + L^*_{u,\text{surface}} \\ C_r C_{d,\text{max}} \\ H_s \end{bmatrix} \quad (16)$$

where $C^*_{u,d,max}$ represents the maximum chroma at hue $H_s$, light $L_{u,surface}$. $C^*_r$ is given by equation (17).

$$C_r = C^*_s / C^*_{s,max} \quad (17)$$

where $C^*_s$ represents chroma of a color of the CRT display, $C^*_{s,max}$ represents the chroma of the color having the maximum chroma in the gamut of the CRT display, the gamut having the same luminance and the same hue as the color by the CRT display.

Lightness $L^*_{u,g}$ is given by equation (18), i.e. lightness $L^*_s$ of the CRT display's color 2305 is linearly compressed.

$$L^*_{u,g} = L^*_{d,\text{min}} + (L^*_{d,\text{max}} - L^*_{d,\text{min}}) \frac{L^*_s - L^*_{s,\text{min}}}{L^*_{s,\text{max}} - L^*_{s,\text{min}}} \quad (18)$$

where $L^*_{s,\,max}$ represents the maximum luminance of the CRT display's gamut, $L^*_{s,\,min}$ represents the minimum luminance thereof, $L^*_{d,\,max}$ does the maximum luminance of printer's gamut and $L^*_{d,\,min}$ does the minimum luminance thereof.

On the other hand, Lightness $L^*_{u,\,surface}$ is extracted by supplying lightness $L^*_s$ of color 2305 to equation (19).

$$L^*_{u,\text{surface}} = L^*_{d,\text{min}} + (L^*_{d,\text{cusp,mapped}} - \quad (19)$$

$$L^*_{d,\text{min}}) \frac{L^*_s - L^*_{s,\text{min}}}{L^*_{s,\text{max}} - L^*_{s,\text{min}}} (L^*_s \le L^*_{s,\text{cusp,mapped}}) L^*_{d,\text{min}} +$$

$$(L^*_{d,\text{max}} - L^*_{d,\text{min}}) \frac{L^*_s - L^*_{s,\text{min}}}{L^*_{s,\text{max}} - L^*_{s,\text{min}}} (L^*_s L^*_{s,\text{cusp,mapped}})$$

where $L^*_{s,\,cusp}$ represents the luminance of the CRT display's cusp, and $L^*_{s,\,cusp}$, mapped represents the lightness of CRT display's cusp mapped on the gamut surface of the printer. The cusp is a sharp point of the gamut having the maximum chroma in a hue, and point 2306 in FIG. 16 is a CRT display's cusp at hue $H_s$, and point 2307 is a printer's cusp at hue $H_s$.

Figure 17A:
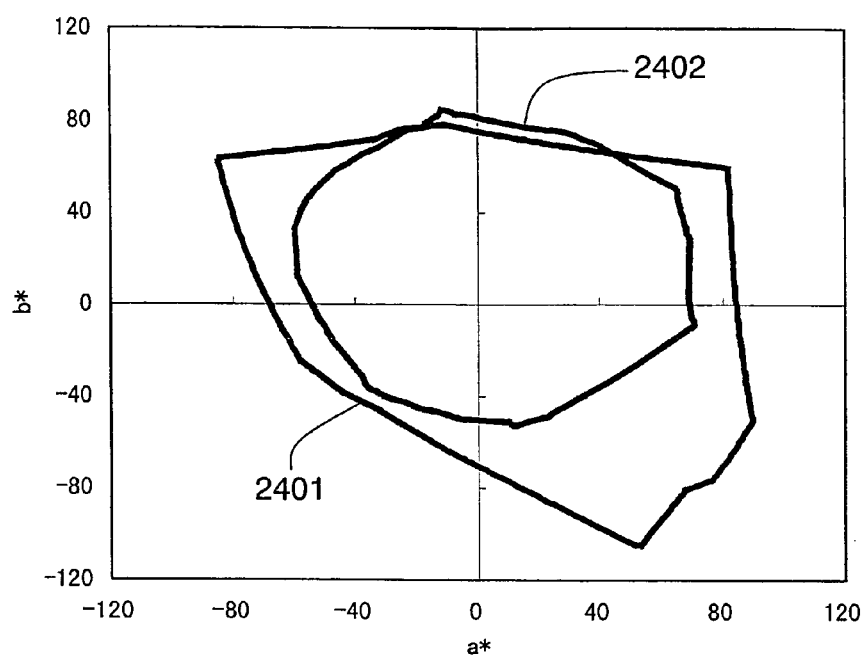
FIG. 17(a) is a projection drawing of respective cusps of a CRT display and a printer of CIELAB space projected to a plane of a–b.
Figure 17B:
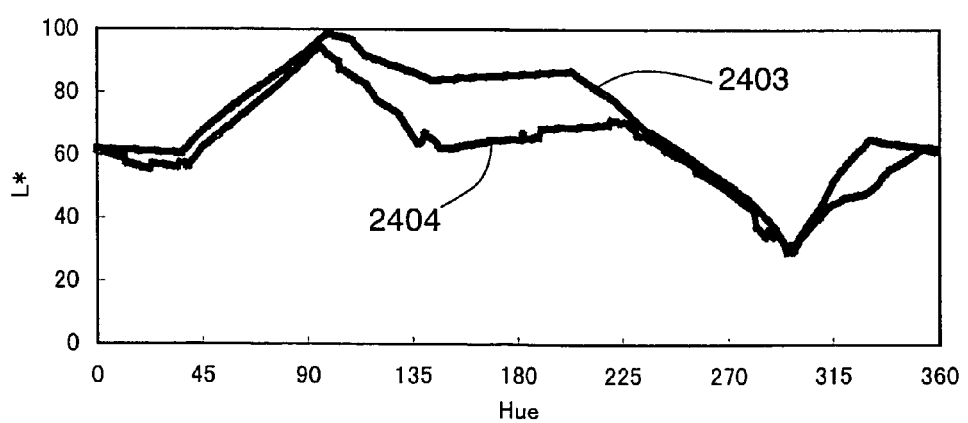
FIG. 17(b) is a projection drawing of respective cusps of a CRT display and a printer of CIELAB space converted to a polar coordinate projected to a plane of L–H.

Lightness $L^*_{s,\,cusp,\,mapped}$ of the CRT display's cusp mapped on the gamut surface of the printer is calculated in this way: FIG. 17 illustrates cusps of the CRT display and the printer. FIG. 17(*a*) is a projection drawing of respective cusps of a CRT display and a printer of CIELAB space projected to a plane of a*–b*. Line 2401 represents the cusp of the CRT display, and line 2402 represents that of the printer. FIG. 17(*b*) is a projection drawing of respective cusps of a CRT display and a printer of CIELAB space converted to a polar coordinate projected to a plane of L*–H (lightness–hue). Line 2403 represents the cusp of the CRT display, and line 2404 represents that of the printer. As shown in FIG. 16, since the cusp has a high chroma in a middle luminance, it draws the viewer's attention.

From the viewpoint of color reproducibility, controlling the cusp is a key for designing a gamut mapping.

Figure 18A:
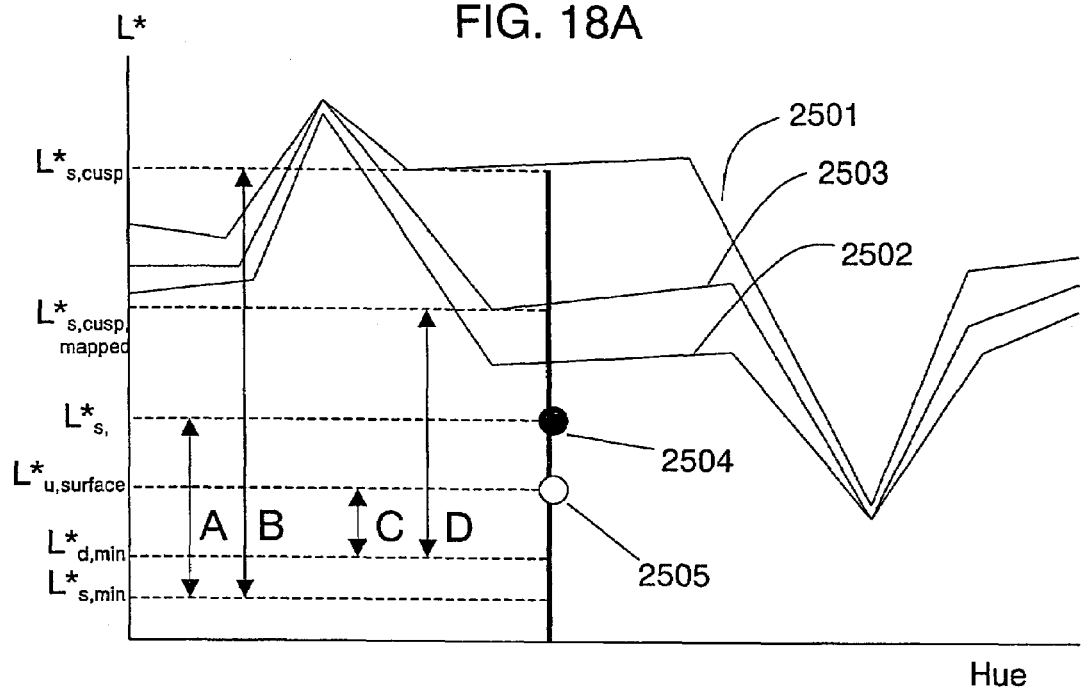
FIG. 18(a) illustrates a case where the lightness $L_s$ of a source device is smaller than cusp's lightness $L_{s,\ cusp,\ mapped}$ mapped on the gamut surface of an output device.
Figure 18B:
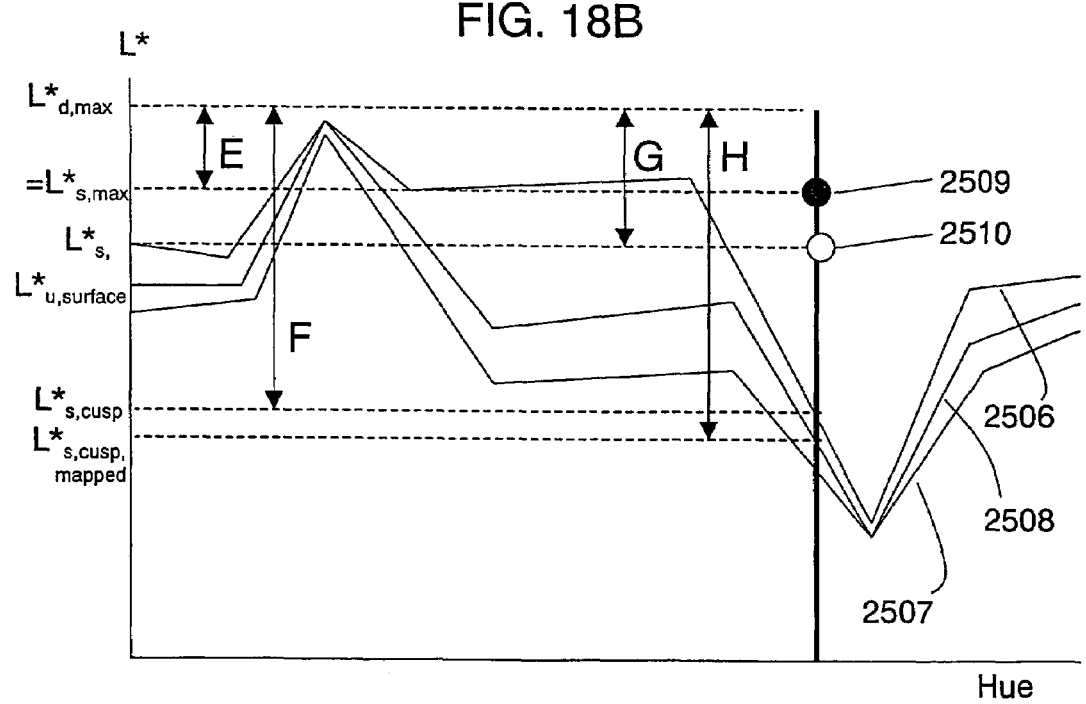
FIG. 18(b) illustrates a case where the lightness $L_s$ of the source device is greater than cusp's lightness $L_{s,\ cusp,\ mapped}$ mapped on the gamut surface of the output device.

FIG. 18 is a schematic diagram of FIG. 17.

In FIG. 18(*a*), line 2501 represents the CRT display's cusp, and line 2502 represents that of the printer. Line 2503 represents the CRT display's cusp mapped on the gamut surface of the printer. Black point 2504 is a color displayed on the CRT display, and white point 2505 represents a mapping color of point 2504 mapped on the surface of the printer's gamut by equation (19). FIG. 18(*a*) shows a case where the lightness $L_s$ of the color by the CRT display is lower than the lightness $L^*_{s,\ cusp,\ mapped}$ of the CRT display's cusp mapped on the surface of the printer's gamut. On the other hand, in FIG. 18(*b*), lines 2506, 2507 and 2508 represent the CRT display's cusp, printer's cusp and the CRT display's cusp mapped on the surface of printer's gamut, respectively. Black point 2509 represents a color displayed by the CRT display, and white point 2510 represents a mapping color of black point 2509 mapped on the surface of the printer's gamut by equation (19). FIG. 18(*b*) shows a case where the lightness $L^*_s$ of the color by the CRT display is higher than the lightness $L^*_{s,\ cusp,\ mapped}$ of the CRT display's cusp mapped on the surface of the printer's gamut. The cusp data (2501, 2502, 2503) shown in FIG. 18(*a*) are identical to the cusp data (2506, 2507, 2508) shown in FIG. 18(*b*).

When the lightness $L^*_s$ of the color by the CRT display is lower than the lightness $L^*_{s,\ cusp,\ mapped}$ of the CRT display's cusp mapped on the surface of the printer's gamut, i.e., in the case of FIG. 18(*a*), 'C' is extracted from equation (20) and $L^*_{u,\ surface}$ is extracted from equation (21).

$$(A/B)=(C/D) \tag{20}$$

$$L^*_{u,surface}=L^*_{d,min}+C \tag{21}$$

This case agrees with a case of $L^*s \square L^*_{s,\ cusp,\ mapped}$ in equation (19). On the other hand, when the lightness $L^*_s$ of the color by the CRT display is higher than the lightness $L^*_{s,\ cusp,\ mapped}$ of the CRT display's cusp mapped on the surface of the printer's gamut, i.e., in the case of FIG. 18(*b*), 'G' is extracted from equation (22), and $L^*_{s,\ surface}$ is extracted from equation (23). This case agrees with a case of $L^*_s > L^*_{s,\ cusp,\ mapped}$ in equation (19).

$$(E/F)=(G/H) \tag{22}$$

$$L^*_{u,surface}=L^*_{d,max}+G \tag{23}$$

Next, finding $L^*_{s,\ cusp,\ mapped}$ (the lightness of the CRT display's cusp mapped on the printer's gamut) in equation (19) is described hereinafter.

As FIG. 17 shows, cusp 2403 of the CRT display has a lightness different from cusp 2404 of the printer. This phenomenon can be seen between many image devices.

The present invention thus considers a color category distribution on a gamut surface, then maps the cusp of the CRT display onto the gamut surface of the printer.

Figure 19A:
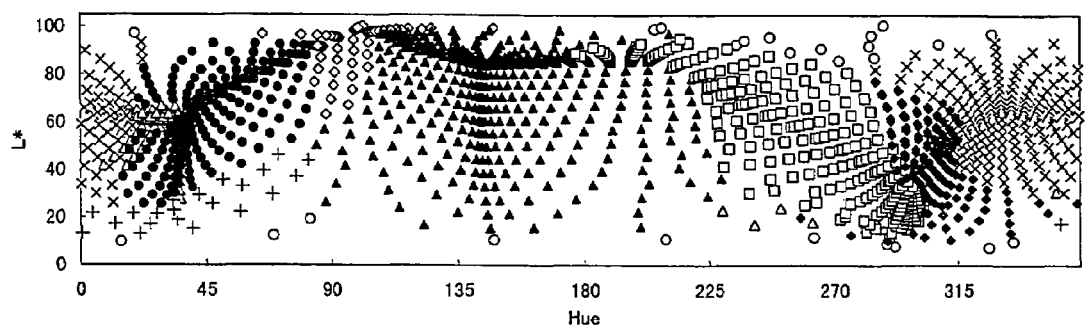
FIG. 19(a) shows a distribution of color category on the gamut surface of a CRT display.
Figure 19B:
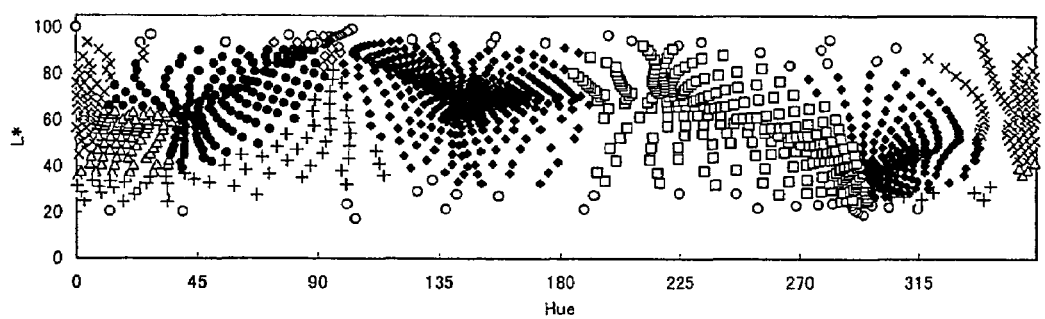
FIG. 19(b) shows a distribution of color category on the gamut surface of a printer.

FIG. 19(*a*) shows a color category distribution of color names that are named by a viewer with respect to the colors on the gamut surface of the CRT display.

FIG. 19(*b*) shows a color category distribution of color names that are named by a viewer with respect to the colors on the gamut surface of the printer.

In FIG. 19, the relation between symbols and colors is this:

white triangle Δ: red
black plus +: brown
black cross X: pink
black ball ●: orange
white wedge ◊: yellow
black triangle ▲: green
white square □: blue
black wedge ♦: violet In FIG. 19, the common feature of the CRT display (FIG. 19(*a*)) and the printer (FIG. 19(*b*)) is that each color has a different spread of distribution in the lightness direction. For instance, green (▲) and blue (□) are spread widely in the lightness direction; however, yellow (◊) and red (Δ) are spread narrowly. Therefore, when the colors on CRT display's gamut surface are mapped onto printer's gamut surface, narrow spread colors such as yellow (◊) and red (Δ) must be mapped within a limited range so that the color category on the CRT display's gamut surface can agree with the counterpart on the printer's gamut surface. For instance, the yellow (◊) spread in the range of 60<L<95 on the CRT display should be mapped in the range of 80<L<95 so that the color category appears yellow on a print by the printer. When the yellow color of L=70 on the CRT display is mapped in the printer's space while preserving the lightness, the color category turns to brown (+). If the mapping is viewed from the standpoint of chroma, the CRT display's cusp must be mapped into the printer's cusp in order to minimize the lowering of chroma. It can be concluded that the two objectives, i.e., agreement between color categories and preserving of chroma, are balanced appropriately in determining mapping points.

Thus, the present invention allows the mapping in the following way: Among the cusps of a source device, the colors widely spread in the lightness direction are mapped near to the cusps of the source device, and the colors narrowly spread are mapped close to the cusps of an output device. For instance, yellow (◊) and red (Δ) are spread narrowly in the lightness direction, thus among the CRT display's cusps, cusps belonging to yellow (◊) and red (Δ) are mapped on the printer's cusps. On the other hand, since green (▲) and blue (□) are spread widely in the lightness direction, among the CRT display's cusps, the cusps belonging to green (▲) and blue (□) are mapped on the cusps of the CRT display.

In order to realize this idea, cusp-lightness-difference-correction-coefficient 't' is introduced. The lightness $L_{s,\ cusp,\ mapped}$ of the CRT display's cusps mapped on the printer's gamut is extracted from equation (24).

$$L^*_{s,cusp,mapped}=L^*_{d,cusp}+te$$

$$e=L^*_{s,cusp}-L^*_{d,cusp} \geq 0 \tag{24}$$

where $L^*_{d,\ cusp}$ represents luminance of the printer's cusp.

The lightness $L^*_{s,\ cusp,\ mapped}$ of the CRT display's cusps mapped on the printer's gamut is closer to CRT display's cusp at greater 't' (cusp-lightness-difference-correction-coefficient); on the other hand it is closer to the printer's cusp at smaller 't'.

According to the present invention, for the colors spread widely in the lightness direction, cusp-lightness-difference-correction-coefficient 't' increases, and for the colors spread narrowly, coefficient 't' decreases. Cusp-lightness-difference-correction-coefficient 't' is extracted from equation (25).

$$t = P_{s,i}\frac{H_{i+1}-H_s}{H_{i+1}-H_i} + P_{s,i+1}\frac{H_s-H_i}{H_{i+t}-H_i}\ (i=1,2,\cdots,6) \tag{25}$$

where $H_i$ represents a hue angle of the 'i'th divided hue, and $P_{s,\ i}$, $P_{s,\ i+1}$ are extracted from equation (26).

$$P_{s,j} = \frac{s'_{LL,J}}{s'_{LL,\max}} (j = 1, 2, \cdots, 7, \quad p_{s,7} = p_{s,1}) \quad (26)$$

$$s'_{LL,J} = \max\left(\frac{s_{LL,k}}{\min(s_{LL,k})} - 1\right)$$

$$s'_{LL,J} = \frac{s_{LL,k}}{\min(s_{LL,k})} - 1 \quad (k = 1, 2, \cdots, 6)$$

where $S_{LL,k}$ represents a standard deviation of lightness component $L_k$ of color category 'k', max( ) represents the maximum value of an element specified in parenthesis ( ), and min( ) represents the minimum value of an element specified in ( ), where $p_{s,7}=p_{s,1}$.

Standard deviation $S_{LL,k}$ of lightness component $L_k$ of color category 'k', is supplied from the database 905 of lightness component dispersion. This data-base is described later.

Lightness component variance database 905 is produced in the following way: The variances of each color category are calculated with a plurality of colorimetric values grouped by viewers through color naming shown in FIG. 10. Variance database 905 can be produced in the same way as color naming database 707 for the output device by using the system shown in FIG. 10. The detailed description is thus omitted here.

In FIG. 10, viewer 1003 watches color patch 1002 having at least one test stimulus of which colorimetric value has been measured on the CRT display or the printer. The viewer names the color with a plurality of color names. To be more specific, color names of color patch 1002—answered by the viewer and rendered on the CRT display or a print by the printer—are fed into calculator 1005 with mouse 1004. When color patch is displayed on the CRT display, calculator 1005 stores the colorimetric values of color patch 1002 or a device-drive-level into lightness-component-variance database 905 responsive to the color names input through mouse 1004.

Variance covariance matrix $\Sigma_i$ shown in equation (27) is calculated using the colorimetric values of each color stored in database 905.

For the color names, categorical basic color names shown in table 1 are used.

TABLE 1

| Category | sLL^2<br>sL * sa<br>sL * sb | sL * sa<br>saa^2<br>sL * sb | sL * sb<br>sa * s<br>sbb^2 |
|---|---|---|---|
| 1<br>Achromatic | 547.14<br>−5.32<br>72.39 | −5.32<br>42.50<br>−29.22 | 72.39<br>−29.22<br>115.28 |
| 2<br>Red | 84.91<br>92.32<br>66.39 | 92.32<br>150.97<br>83.74 | 66.39<br>83.74<br>171.29 |
| 3<br>Brown | 289.98<br>−54.61<br>125.78 | −54.61<br>120.48<br>−105.61 | 125.78<br>−105.61<br>346.42 |
| 4<br>Pink | 173.26<br>−98.38<br>7.37 | −98.38<br>253.98<br>−37.42 | 7.37<br>−37.42<br>83.36 |
| 5<br>Orange | 197.10<br>−62.18<br>32.23 | −62.18<br>226.65<br>−54.15 | 32.23<br>−54.15<br>320.82 |
| 6<br>Yellow | 13.04<br>−3.02<br>−11.40 | −3.02<br>23.64<br>−50.15 | −11.40<br>−50.15<br>340.27 |
| 7<br>Green | 202.48<br>52.16<br>18.75 | 52.16<br>219.84<br>22.72 | 18.75<br>22.72<br>372.51 |
| 8<br>Blie | 335.67<br>−191.86<br>126.79 | −191.86<br>295.46<br>−129.90 | 126.79<br>−129.90<br>164.13 |
| 9<br>Purple | 223.89<br>−97.20<br>71.21 | −97.20<br>223.21<br>−45.20 | 71.21<br>−45.20<br>102.39 |

Table 1 shows an example of variance covariance matrix of the printer. In order to make every colorimetric value be a positive value, $[L^*, a^*, b^*]^t$ is converted to $[\alpha, \beta, \gamma]^t$ with equation (28), and variance covariance matrix $\Sigma_i$ is found by using $[\alpha, \beta, \gamma]^t$.

$$\begin{bmatrix} \alpha \\ \beta \\ \gamma \end{bmatrix} = \begin{bmatrix} L^* \\ a^* \\ b^* \end{bmatrix} + \begin{bmatrix} 78 \\ 128 \\ 128 \end{bmatrix} \quad (28)$$

Lightness dispersion is represented by $S_{LL}^2$ at the first row and the first column shown in table (1) in the variance covariance matrix. This is substituted to equation (26) to get $p_{s,i}$. Equation (25) has a function to interpolate $p_{s,i}$ and $p_{s,\,i+1}$ at two hues. The actual meaning of correction-coefficient 't' exists in $p_{s,i}$ and $p_{s,\,i+1}$. Table 2 lists $p_{s,i}$ calculated with the lightness standard deviation shown in Table 1 and equation (26). As shown by equation (25), $p_{s,i}$ has six values, and these six values are defined on divided hues. Other than the $$\sum_i = \begin{bmatrix} S_{11} & S_{12} & S_{13} \\ S_{21} & S_{22} & S_{23} \\ S_{31} & S_{32} & S_{33} \end{bmatrix} \quad (27)$$

$$= \begin{bmatrix} \frac{1}{n-1}\sum_{i=1}^{n}(X_{1_i} - \mu_1)^2 & \frac{1}{n-1}\sum_{i=1}^{n}(X_{1_i} - \mu_1)(X_{2_i} - \mu_2) & \frac{1}{n-1}\sum_{i=1}^{n}(X_{1_i} - \mu_1)(X_{3_i} - \mu_1) \\ \frac{1}{n-1}\sum_{i=1}^{n}(X_{2_i} - \mu_2)(X_{1_i} - \mu_1) & \frac{1}{n-1}\sum_{i=1}^{n}(X_{2_i} - \mu_2)^2 & \frac{1}{n-1}\sum_{i=1}^{n}(X_{2_i} - \mu_2)(X_{3_i} - \mu_3) \\ \frac{1}{n-1}\sum_{i=1}^{n}(X_{2_i} - \mu_2)(X_{1_i} - \mu_1) & \frac{1}{n-1}\sum_{i=1}^{n}(X_{3_i} - \mu_3)(X_{2_i} - \mu_2) & \frac{1}{n-1}\sum_{i=1}^{n}(X_{3_i} - \mu_3)^2 \end{bmatrix}$$

divided hues are interpolated by using interior division ratio of hue $H_s$ of an input color vs. two adjacent divided hues $H_i$, and $H_{i+1}$. For the divided hues, primary colors, i.e., red, green and blue as RGB digital count $(d_r, d_g, d_b)$ are used, and the secondary colors, i.e., cyan, magenta and yellow are also used. In other words, as shown in Table 3, red is expressed as a hue of CRT display emitted by $(d_r, d_g, d_b)=(255, 0, 0)$. In the same manner, yellow has a hue of the CRT display emitted by $(d_r, d_g, d_b)=(255, 255, 0)$. Relations between eight color categories except no-chroma colors and six divided hues are listed in Table 3.

TABLE 2

| Category | | ps, b |
|---|---|---|
| 2 | Red | 0.381 |
| 3 | Brown | 0.912 |
| 4 | Pink | 0.649 |
| 5 | Orange | 0.709 |
| 6 | Yellow | 0 |
| 7 | Green | 0.722 |
| 8 | Blue | 1 |
| 9 | Purple | 0.722 |

TABLE 3

| Divided hue | Digital count (dr, dg, db) | Category | | ps, b |
|---|---|---|---|---|
| 36.1 | (255, 0, 0) | 2 | Red | 0.381 |
| 98.2 | (255, 255, 0) | 6 | Yellow | 0.000 |
| 143.4 | (0, 255, 0) | 7 | Green | 0.722 |
| 203.2 | (0, 255, 255) | 8 | Blue | 1.000 |
| 296.5 | (0, 0, 255) | 9 | Purple | 0.772 |
| 330.5 | (255, 0, 255) | 10 | Pink | 0.649 |

Figure 20:
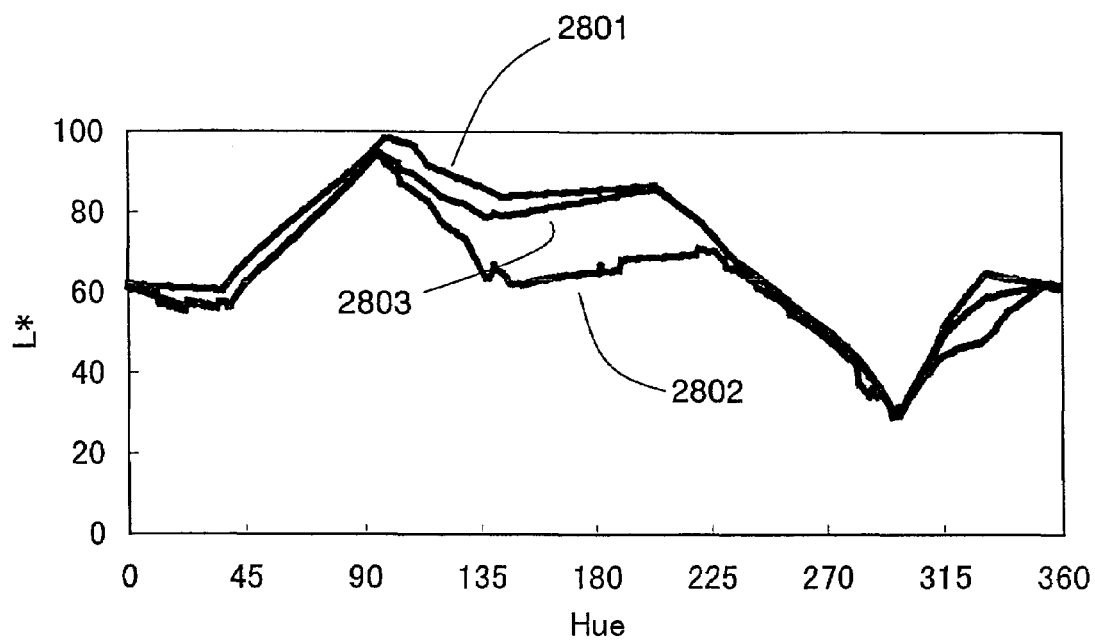
FIG. 20 shows mapping result of lightness of CRT display's cusp.

FIG. 20 shows resultant mapping of the CRT display's cusps by giving the data in Table 3 to equation 19.

In FIG. 20, line 2801 represents the CRT display's cusps, line 2802 represents printer's cusps, and line 2803 represents the CRT display's cusps mapped according to equation 19.

In the region from red to yellow, i.e., from hue angle 0 (zero) degree to around 100 degree, cusp 2803 mapped agrees with cusp 2802 of the printer.

In the range from ca. 100 degree to ca. 200 degree, i.e., the range where yellow changes to blue, cusp 2803 mapped approaches to CRT display's cusp 2801 from printer's cusp 2802.

In this second embodiment, a linear mapping along the lightness axis and expressed by equation (18) is used for the description; however, non-linear mapping is applicable instead of equation (18).

For instance, try to find the lightness—perceived by the viewer on the border between black and gray as well as on the border between gray and white also perceived by the viewer—on both the CRT display and the printer with respect to a color on the lightness axis (a color of L=0). In the case of lightness mapping on the lightness axis from the CRT display to the printer, the following four points are used as reference points: (a) border between black and gray, (b) border between gray and white, (c) min. lightness point on the CRT display and the counterpart mapped on the printer, (d) max. lightness point on the CRT display and the counterpart mapped on the printer. Based on these four reference points, overall lightness can be covered by a line graph or a curve, so that non-linear mapping is realized.

Besides the mapping on the lightness axis, the present invention allows the colors on the CRT display's lightness axis to be mapped onto the printer's lightness axis.

The categorical basic color names shown in Table 1 are used in the color naming by the viewer; however, other color names such as memorized colors which are key to determine the color reproducibility, color names set by the viewer per se, can be used.

When the names of colors perceived by the viewer are used for color naming, the mapping can be controlled in an image gamut oriented manner, so that efficient and appropriate color-information-exchange is realized compared with a case where a device's gamut is entirely covered.

In this second embodiment, the variance covariance matrix in equation (27) is calculated through grouping the colorimetric values of the test colors showed in color naming responsive to the color names given by the viewers. However, the variance covariance matrix can be defined by the device-drive-level, e.g., CRT display's drive level $(d_r, d_g, d_b)$, instead of the method discussed above.

Respective processes of the color information exchanging, used in the second embodiment, shown in FIG. 14 are detailed hereinafter.

Figure 21:
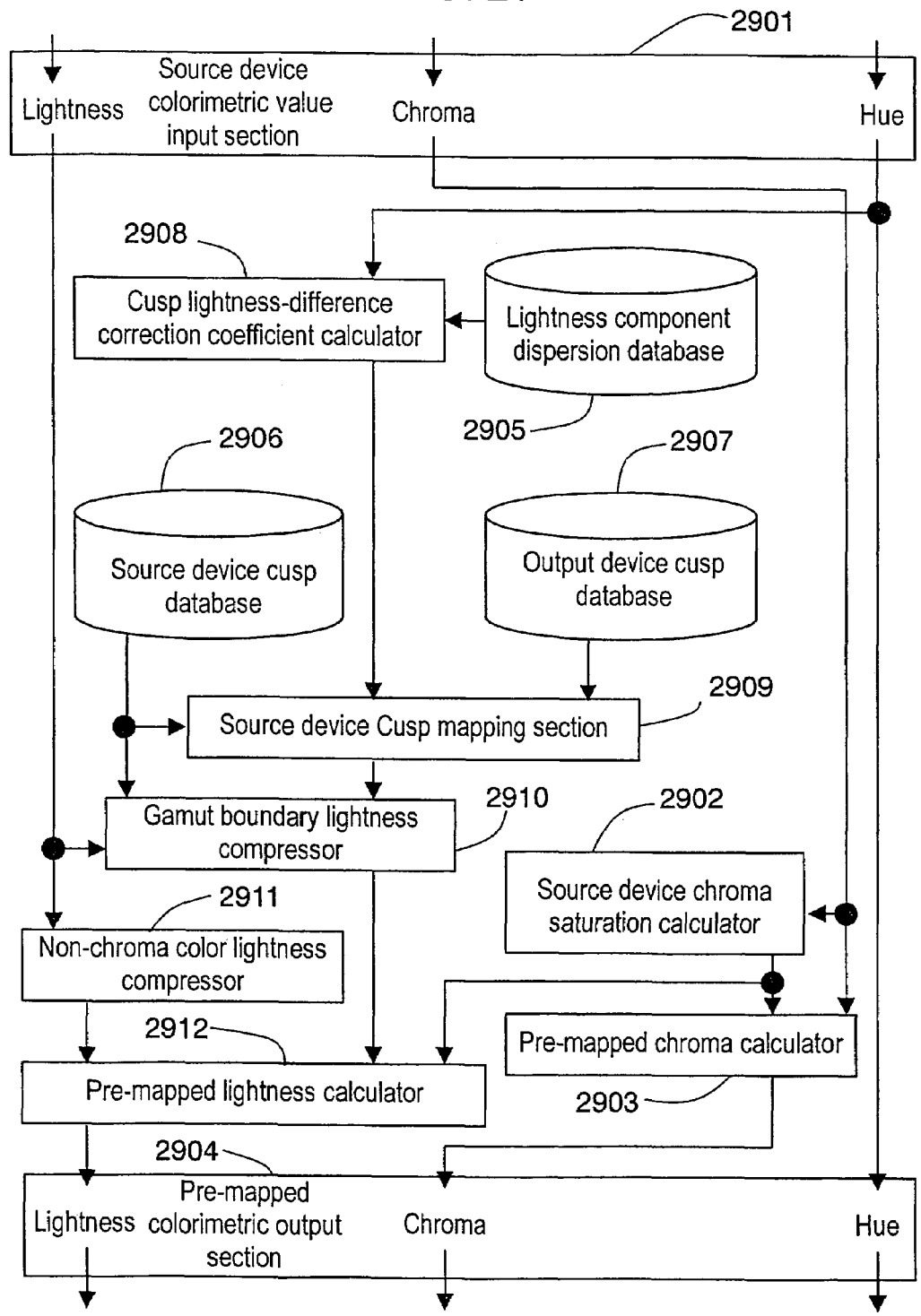
FIG. 21 illustrates an inside structure of a pre-mapping section in accordance with the second exemplary embodiment of the present invention.

First, the construction of pre-mapping section 2109 is described. FIG. 21 illustrates the structure of pre-mapping section 2109.

In FIG. 21, source device colorimetric value input section 2901 receives an output from polar coordinate converter 2104 shown in FIG. 14, i.e., the lightness, chroma, and hue $[L^*, C^*, H_s]_s$ of the color of the CRT display (source device).

Source device chroma saturation calculator 2902 receives chroma $C_s$ supplied from input section 2901 and calculates a saturation degree of source device's chroma. Pre-mapped chroma calculator 2903 receives the saturation degree, and compresses the chroma of the color on the CRT display, then outputs the resultant compressed chroma to pre-mapped colorimetric output section 2904.

Lightness component variance database 2905 has stored the variance of the lightness component found to respective color names from the colorimetric values of the CRT display's color names.

Cusp database 2906 for the source device has stored the lightness, chroma and hue of the cusp of the CRT display's gamut.

Cusp database 2907 for the output device has stored the lightness, chroma and hue of the cusp of the gamut of the printer (output device).

Cusp lightness-difference correction coefficient calculator 2908 calculates a cusp lightness-difference correction coefficient by using hue $H_s$ of the color by the color display and variance information supplied from database 2905. Cusp mapping section 2909 for the source device maps the cusps of the CRT display onto the gamut surface of the printer based on cusp lightness-difference correction coefficient supplied from calculator 2908, lightness information of the cusps supplied from database 2906 and another lightness information of the cusps supplied from database 2907.

An output from source device cusp mapping section 2909 is fed into gamut boundary lightness compressor 2910, which compresses the lightness of a color from the source device referring to the lightness information supplied from database 2906. On the other hand, the lightness of the color by the CRT display is fed into non-chroma color lightness compressor 2911 and compressed.

An output from gamut boundary lightness compressor 2910, an output from non-chroma lightness compressor 2911 and an output from source device chroma saturation calculator 2902 are supplied to pre-mapped lightness calculator 2912, where these outputs are converted to the lightness of pre-mapped colorimetric values. Then, the converted values are supplied to pre-mapped colorimetric output section 2904. The hue of the CRT display's color is directly supplied to output section 2904.

Figure 22:
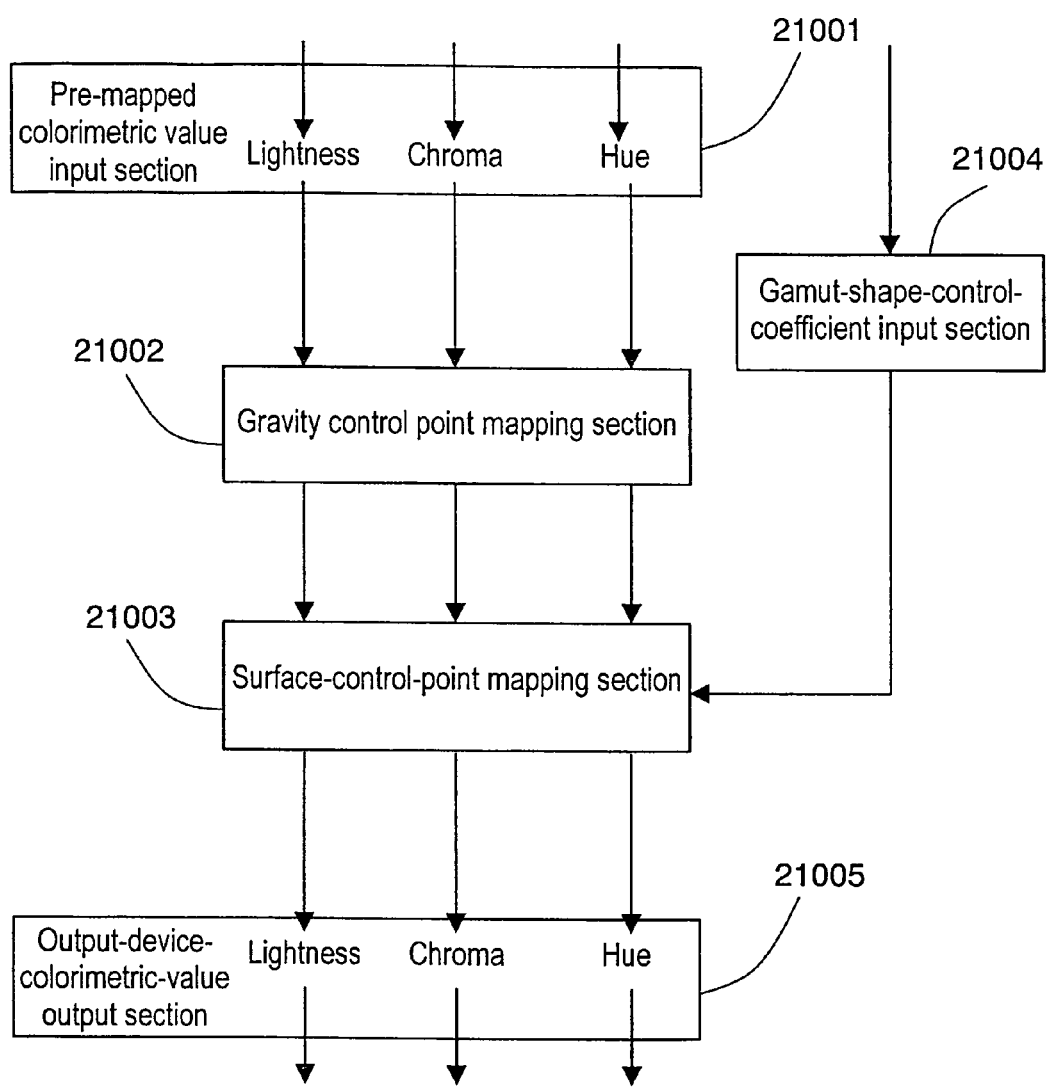
FIG. 22 illustrates an inside structure of a main mapping section in accordance with the second exemplary embodiment of the present invention.

Next, a structure of main-mapping section 2110 shown in FIG. 14 is described. FIG. 22 illustrates the structure of main-mapping section 2110. Pre-mapped colorimetric value input section 21001 receives an output $[L^* \; C^* \; H]_u$ from pre-mapping section 2109.

Gravity control point mapping section 21002 provides an output $[L^* \; C^* \; H]_u$ from pre-mapped colorimetric input section 21001 with gravity-control-point mapping, and supplies the resultant output to surface-control-point mapping section 21003.

Surface-control-point mapping section 21003 receives gamut shape control coefficient $w_c$ supplied from gamut-shape-control-coefficient input section 21004, and provides an output from gravity control point mapping section 21002 with surface control point mapping. The resultant output is supplied to the printer via output-device-colorimetric-value output section 21005.

Main-mapping section 2110 designs a mapping by utilizing control points set in the color space of the CRT display (source device) and the printer (output device).

Control points are grouped into gravity control points and surface control points. The main-mapping includes a gravity control mapping which is practiced between the gravity control points, and a surface control point mapping which is practiced between the surface control points. All the subject control points on the source device and their counterparts on the output device are selected from the identical color category, whereby the mapping, in which the color category is preserved, can be realized.

Figure 23:
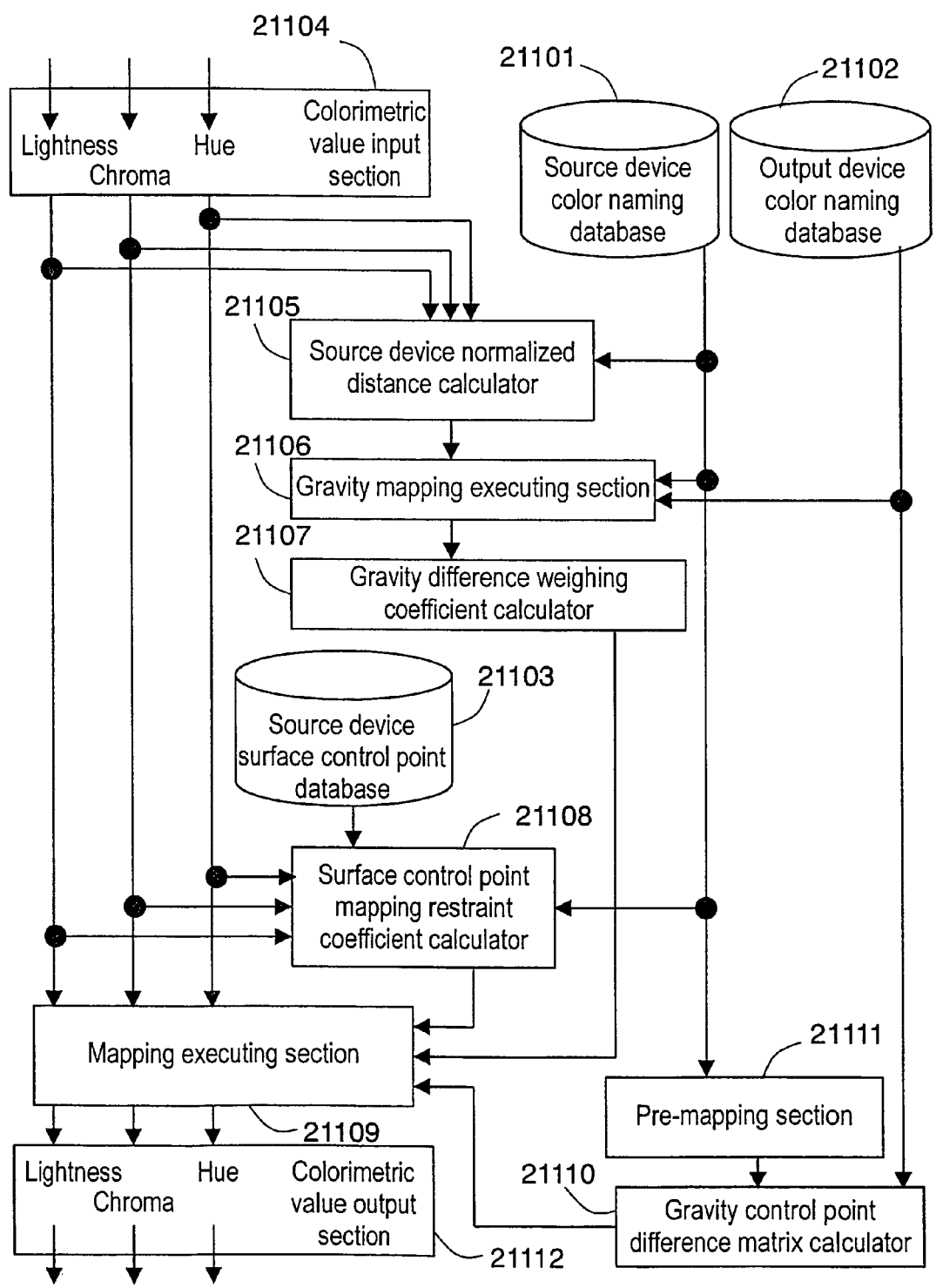
FIG. 23 illustrates an inside structure of a gravity control point mapping section in accordance with the second exemplary embodiment of the present invention.

A structure of gravity control point mapping section 21002 shown in FIG. 22 is described. FIG. 23 shows the structure of gravity control point mapping section 21002. Color naming database 21101 for the source device has the same functions as that of the first embodiment, namely, it has stored colorimetric values of the colors of the CRT display, and the gravity vectors for each color as well as variance covariance matrixes also for each color.

Color naming database 21102 for the output device has the same functions as that of the first embodiment, namely, it has stored colorimetric values of the colors of the printer, and the gravity vectors for each color as well as variance covariance matrixes also for each color.

Surface control point database 21103 for the source device has stored lightness, chroma, hue of the mapping control points provided to the gamut surface of the CRT display, or near to the surface thereof.

Colorimetric input section 21104 outputs the lightness, chroma, hue $[L^* \; C^* \; H]_u$ of the pre-mapped colorimetric value to the following three systems:

The first system is to calculate a gravity difference weighing coefficient, and the lightness, chroma, hue $[L^* \; C^* \; H]_u$ are supplied to normalized distance calculator 21105 for the source device.

Calculator 21105 calculates the normalized distances between the pre-mapped colormetric values and nine color categories based on the gravity vectors and variance covariance matrixes supplied from database 21101.

Gravity mapping executing section 21106 executes mapping between the gravities based on the gravity vectors and variance covariance matrixes supplied from database 21101 as well as those supplied from database 21102.

Gravity difference weighing coefficient calculator 21107 calculates the coefficient using an output from executing section 21106.

The second system is to calculate a surface control point mapping restraint coefficient, and the lightness, chroma, hue $[L^* \; C^* \; H]_u$ are fed to surface control point mapping restraint coefficient calculator 21108.

Calculator 21108 receives pre-mapped colorimetric values, the information of surface control point supplied from database 21103 and the output of database 21101, then calculates the restraint coefficient.

The third system is to use mapping executing section 21109. Gravity control point difference matrix calculator 21110 calculates a gravity control point difference matrix based on an output from pre-mapping section 21111 and an output from database 21102.

Calculator 21110 receives information from pre-mapping section 21111, where the information contains hue, chroma, lightness of the pre-mapped gravity vector in the color space of the CRT display. The process by pre-mapping section 21111 is the same as pre-mapping section 2109 shown in FIG. 14. Detailed description thereof is thus omitted here.

Calculator 2110, on the other hand, receives information from database 21102, where the information contains gravity vectors in the color space of the output device.

Mapping executing section 21109 receives the gravity difference weighing coefficient from calculator 21107, also receives the surface control point mapping restraint coefficient from calculator 21108, and further receives the gravity control points difference matrix from calculator 21110, thereby executing the gravity-control-point mapping to the lightness, chroma, hue $[L^* \; C^* \; H]_u$ of the pre-mapped colorimetric value.

Figure 24:
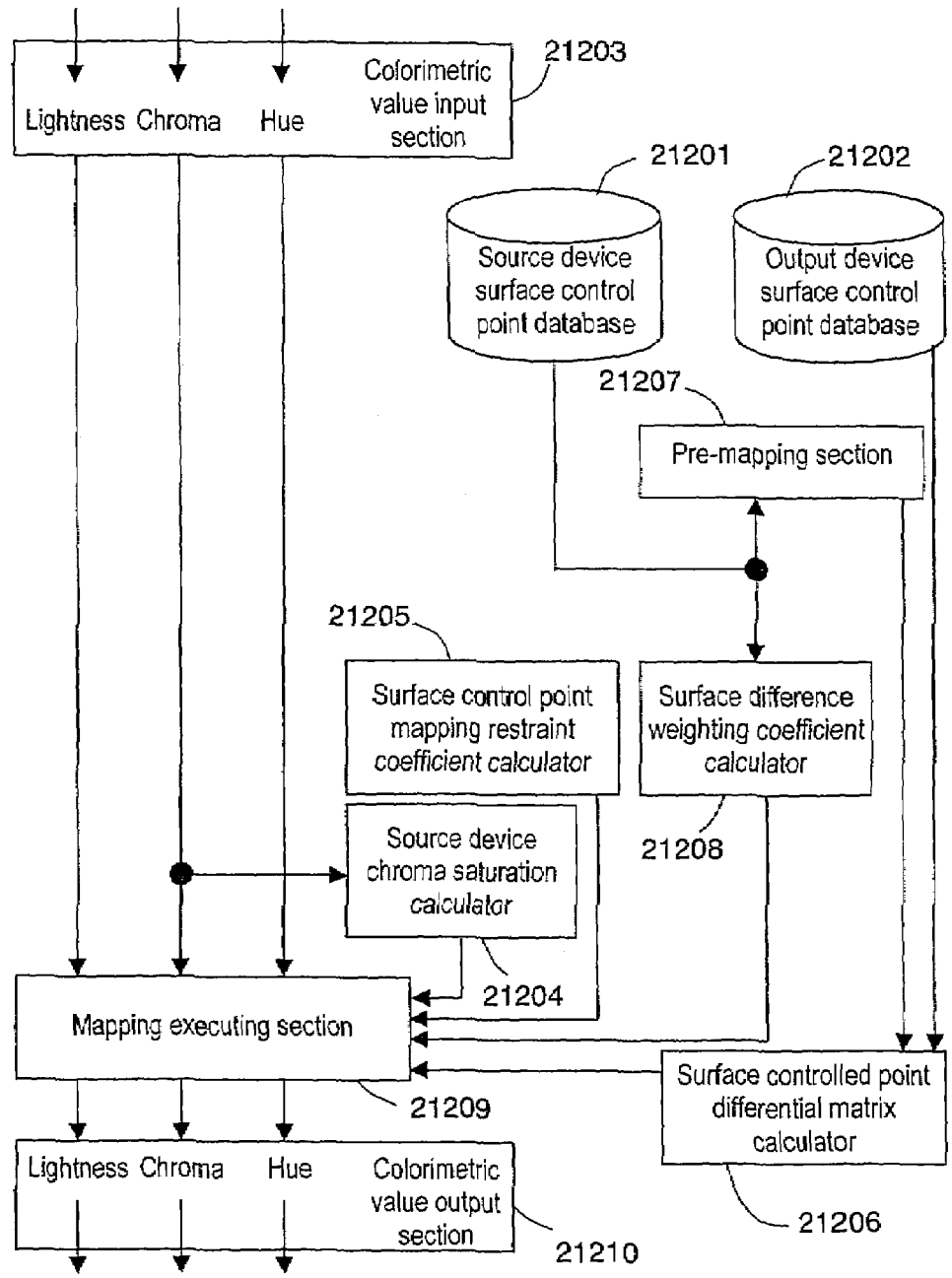
FIG. 24 illustrates an inside structure of a surface control point mapping section in accordance with the second exemplary embodiment of the present invention.

A structure of surface-control-point-mapping section 21003 shown in FIG. 22 is detailed hereinafter. FIG. 24 illustrates an inner structure of mapping section 21003.

Surface control point database 21201 for the source device has stored the lightness, chroma, and hue of the mapping-control-points provided on the gamut surface of the CRT display or near to the surface thereof.

Colorimetric value input section 21203 receives an output from gravity-control-point mapping section 21002 shown in FIG. 22.

Source device chroma saturation calculator 21204 calculates a degree of source-device-chroma-saturation using the chroma component of gravity control point mapped colorimetric value.

Surface control point mapping restraint coefficient calculator 21205 has the same function as calculator 21108 shown in FIG. 23, and calculates a surface-control-point-mapping-restraint coefficient.

Surface control point difference matrix calculator 21206 calculates a surface control difference matrix using CRT display's surface control points pre-mapped by pre-mapping section 21207 and printer's surface control points.

The processes by pre-mapping section 21207 are the same as pre-mapping section 2109 shown in FIG. 14; thus detailed description is omitted here.

Surface difference weighing coefficient calculator 21208 calculates a surface difference weighing coefficient using colorimetric values of the surface control points supplied from surface control point database 21201 for the source device.

Mapping executing section 21209 receives the chroma saturation degree of the source device from calculator 21204, and also receives the surface control point mapping restraint coefficient from calculator 21205, and receives the surface control points difference matrix from calculator 21206, and further receives the surface difference weighing coefficient from calculator 21208, and further receives the gamut-shape-cntrol-coefficient from calculator 2108 in FIG. 14, thereby executing the surface-control-point mapping to the lightness, chroma, hue of the gravity-control-point mapped colorimetric value.

An output from mapping executing section 21209 is supplied to the printer via colorimetric values output section 21210.

Next, the processes of gravity-control-point-mapping shown in FIG. 23 and surface-control-point-mapping shown in FIG. 24 are described hereinafter.

Main-mapping section 2110 converts the pre-mapped colorimetric value $[L^* \; C^* \; H]_u$ into main-mapped colorimetric value $[L^* \; C^* \; H]_d$, i.e., final mapping point, by the mapping expressed in the second and third terms of equation (29).

$$\begin{bmatrix} L^* \\ C^* \\ H \end{bmatrix}_d = \begin{bmatrix} L^* \\ C^* \\ H \end{bmatrix}_u + FMW_m + JC_r(1-F)PW_r \qquad (29)$$

where $[L^* \; C^* \; H]_u$=the pre-mapped colorimetric value given by equation (16),
matrix M=gravity control point difference matrix,
matrix P=surface control point difference matrix,
$W_m$=gravity difference weighing coefficient,
$W_r$=surface difference weighing coefficient,
F=surface control point mapping restraint coefficient,
$C_r$=source device chroma saturation degree,
matrix J=gamut shape control coefficient matrix.

As expressed in equation (29), a main-mapping process by main-mapping section 2110 shown in FIG. 14 includes two mapping processes, namely, $FMW_m$ and $JC_r(1-F)PW_r$.

Among $FMW_m$, the $MW_m$ functions to map the gravity control points provided in the color spaces of both the CRT display and printer, and is referred to as "gravity control point mapping".

Among $JC_r(1-F)PW_r$, the $JC_rPW_r$ functions to map the surface control points provided in the color spaces of both the source and output devices, and is referred to as "surface control point mapping".

Surface control point mapping restraint coefficient 'F' functions to keep balance between the gravity control point mapping $MW_m$ and surface control point mapping $JC_rPW_r$. Restraint coefficient 'F' interpolates the two mapping functions into linear model based on an input position of pre-mapped colorimetric value $[L^* \; C^* \; H]_u$.

The second term $FMW_m$ and the third term $JC_r(1-F)PW_r$ of equation (29) are detailed hereinafter.

The elements constituting the second term, i.e., gravity control point difference matrix M, gravity difference weighing coefficient $W_m$, surface control mapping restraint coefficient F, are detailed hereinafter in this order.

Matrix M is given by equation (30).

where $L^*_{\mu, d, i}$, $C^*_{\mu, d, i}$, $H^*_{\mu, d, i}$ are gravity vectors of color category 'i' in the printer.

The color category employs the nine color names shown in Table 1. The gravity vectors are found in this way: Sample data in color naming are converted into values a α β γ with equation (28), then gravities of respective color categories are found by the converted values in equation (31), and they undergo polar coordinate conversion.

$$\begin{bmatrix} \alpha_\mu \\ \beta_\mu \\ \gamma_\mu \end{bmatrix}_i = \begin{bmatrix} \frac{1}{n}\sum_{j=1}^{n} \alpha_j \\ \frac{1}{n}\sum_{j=1}^{n} \beta_j \\ \frac{1}{n}\sum_{j=1}^{n} \gamma_j \end{bmatrix}_i \qquad (31)$$

In equation (30), $L^*_{u, d, i}$, $C^*_{\mu, d, i}$, $H^*_{\mu, d, i}$ represent pre-mapped gravity vectors, where the gravity vector of color category 'i' of the source device is mapped with equation (16). The color category employs the nine color names listed in Table 1, and the gravity vectors are found by extracting samples' gravities from equation (31), then they undergo polar coordinate conversion, this is the same procedure as that in the case of the output device. As equation (30) shows, when the pre-mapped colorimetric values $[L^* \; C^* \; H]_u$ are extracted from gravity vectors of the source device, matrix M is to map the pre-mapped colorimetric values $[L^* \; C^* \; H]_u$ to gravity vector $[L^* \; C^* \; H]_{\mu,d}$ of the output device. Therefore, matrix M has a function of mapping the gravity vector in the color space of the source device to that in the color space of the output device.

Next, gravity difference weighing coefficient $W_m$ is described hereinafter.

Weighing coefficient $W_m$ weighs mapping control over matrix M with respect to each gravity of respective colors based on an input position of the pre-mapped colorimetric $[L^* \; C^* \; H]_u$, thereby realizing the mapping control over matrix M with respect to any pre-mapped colorimetric value $[L^* \; C^* \; H]_u$. Coefficient $W_m$ is given by equation (32).

$$w_{m,j} = \frac{\frac{1}{D_{t,i}}}{\sum_{j=1}^{9} \frac{1}{D_{t,j}}} \qquad (32)$$

if $D_{t,i} = 0$ then $w_{m,i} = 1$, $w_{m,k \neq i} = 0$ if $D_{m,k \neq i} = 0$ then $w_{m,k \neq i} = 1$, $w_{m,l \neq i \neq k} = 0$ where $D_{t,i}$ represents an intermediate normalized distance. Coefficient $W_m$ increases at smaller intermediate normalized $$M = \begin{bmatrix} L^*_{\mu,d,1} - L^*_{\mu,\mu,1} & L^*_{\mu,d,2} - L^*_{\mu,\mu,2} & L^*_{\mu,d,3} - L^*_{\mu,\mu,3} & \cdots & L^*_{\mu,\mu,9} - L^*_{\mu,\mu,9} \\ C^*_{\mu,d,1} - C^*_{\mu,\mu,1} & C^*_{\mu,d,2} - C^*_{\mu,\mu,2} & C^*_{\mu,d,3} - C^*_{\mu,\mu,3} & \cdots & C^*_{\mu,\mu,9} - C^*_{\mu,\mu,9} \\ 0 & 0 & H^*_{\mu,d,3} - H^*_{\mu,\mu,3} & \cdots & H^*_{\mu,\mu,9} - H^*_{\mu,\mu,9} \end{bmatrix} \qquad (30)$$

distance $D_{t,\,i}$, and decreases at greater intermediate normalized distance $D_{t,\,i}$, Which is given by equation (33).

$$Dt = VDs \Leftrightarrow \begin{bmatrix} D_{t,1} \\ D_{t,2} \\ \vdots \\ D_{t,9} \end{bmatrix} = \begin{bmatrix} V_1 & 0 & \cdots & 0 \\ 0 & V_2 & \vdots & 0 \\ \vdots & \vdots & \ddots & \vdots \\ 0 & 0 & \vdots & V_9 \end{bmatrix} \begin{bmatrix} D_{s,1} \\ D_{s,2} \\ \vdots \\ D_{s,9} \end{bmatrix} \quad (33)$$

where $D_s$ represents a color categorical normalized distance vector of the source device's colorimetric value. Gravity mapping scaling matrix 'V' obtains intermediate normalized distance $D_t$ by mapping color categorical normalized distance $D_s$ of the source device's colorimetric value to the color space of the output device.

On the other hand, color categorical normalized distance $D_i$ is the distance from a certain colorimetric vector $X=[\alpha\ \beta\ \gamma]^t$ to the gravity of color category 'i' and given by equation (34).

$$D_i = \sqrt{(X - \mu_i)\overset{-1}{\underset{i}{\Sigma}}(X - \mu_i)} \quad (34)$$

where $\mu_i$ represents the gravity vector of color category 'i' and $\Sigma_i$ represents the variance covariance matrix of color category 'i'.

As shown in FIG. 19, a spread of color category's distribution depends on respective color categories, and a distance in CIELAB space is not proportionate to a color categorical distance. In other words, red category (▲) has a smaller spread than green category (Δ), and a distance in CIELAB space seems a greater distance for the red category from the color categorical view of point. Color categorical normalized distance $D_i$ is a normalized distance with consideration of distribution-spreads of respective color categories, and distance $D_i$ is proportionate to a color categorical perspective measure.

Gravity mapping scaling matrix 'V' in equation (33) is described hereinafter. This matrix 'V' is given by equation (35).

$$\begin{bmatrix} V_1 \\ V_2 \\ \vdots \\ V_9 \end{bmatrix} = \phi \begin{bmatrix} w_{v,1} \\ w_{v,2} \\ \vdots \\ w_{v,9} \end{bmatrix} \quad (35)$$

$$= w_{v,1} \begin{bmatrix} v_{11} \\ v_{21} \\ \vdots \\ v_{91} \end{bmatrix} + w_{v,2} \begin{bmatrix} v_{12} \\ v_{22} \\ \vdots \\ v_{92} \end{bmatrix} + \cdots + w_{v,9} \begin{bmatrix} v_{19} \\ v_{29} \\ \vdots \\ v_{99} \end{bmatrix}$$

where $\Phi$ represents a gravity mapping scaling matrix, and this matrix has a function of converting a distance-relation between gravity vectors in the CRT display into a distance-relation between gravity vectors in the printer. Geometrically, it maps the gravity vectors of the source device to the gravity vectors of the output device.

Gravity mapping scaling coefficient matrix $\Phi$ has element $v_{lm}$. This element $v_{lm}$ is a scaling coefficient which converts normalized distance $D_{s,\,lm}$—extending over the gravity of color category 'l' to the gravity of color category 'm' in the color space of the source device—into normalized distance $D_{d,\,lm}$—extending over the gravity of color category 'l' to the gravity of color category 'm' in the color space of the output device.

Matrix $\Phi$ has all the scaling coefficients with respect to every possible combination of nine color categories; thus, the gravity vectors in the color space of the source device are mapped to the gravity vectors in the same color category. However, as shown by equation (35), scaling coefficient $(v_{1l}, \ldots, v_{mm})$ for its own distance becomes zero (0).

Geometrically, matrix $\Phi$ means to map the nine gravity vectors of the source device to those of the output device. From the viewpoint of color reproducibility, it corresponds to the mapping between the original and its counterpart having the same color category by using the normalized distance.

Intermediate normalized distance $D_{t,i}$ is a distance found by mapping the color categorical normalized distance in the source device to the output device with matrix 'V'. This mapping corresponds to the mapping of the gravity of the same color category.

Next, the way of finding weighing coefficient $w_{v,i}$ is described with respect to gravity-control-point-difference matrix 'M' of equation (35) by using the normalized distance mapped to the output device's color space. Weighing coefficient $w_{v,i}$ is given by equation (36).

$$w_{v,j} = \frac{\frac{1}{D_{s,i}}}{\sum_{j=1}^{9} \frac{1}{D_{s,j}}} \quad (36)$$

if $D_{s,i} = 0$ then $w_{v,i} = 1$, $w_{v,k \neq i} = 0$ if $D_{s,k \neq i} = 0$ then $w_{v,k \neq i} = 1$, $w_{v,l \neq i \neq k} = 0$ Equation (36) functions to cover the mapping of gravity to the places other than the gravity, and interpolates gravity's mapping information responsive to the positional relation between color vector X and gravity vector $\mu$ before carrying out the function.

In equation (35), column vector element $[v_{1i}, v_{2i}, \ldots, v_{9i}]$ of gravity mapping scaling coefficient matrix $\Phi$ is a scaling coefficient in color category 'i', and these scaling coefficients are weighed by weighing coefficient $w_{v,i}$.

Weighing coefficient $w_{v,i}$ is defined by B/A, where 'A' represents the sum of inverses of the normalized distances between the gravities of nine color categories, and 'B' represents the inverse of the normalized distances between the gravities of color category 'i'. Therefore, the gravity of the color category nearer to color vector X has more important scaling coefficient, and the gravity of the color category farther from color vector X has less important scaling coefficient.

In summary, pre-mapped colorimetric value $[L^* \ C^* \ H]_u$ is converted to color categorical normalized distance $D_s$ with equation (34), then converted to intermediate normalized distance $D_t$ with gravity-mapping-scaling-matrix 'V' of equation (33). Then, in the output device's color space, gravity-difference-weighing-coefficient $w_m$ is calculated with equation (32).

Surface control point mapping restraint coefficient 'F' is described hereinafter. As mentioned previously, coefficient 'F' functions to keep balance between gravity-control-mapping $MW_m$ and surface-control-point-mapping $JC_rPW_r$, and based on pre-mapped colorimetric value $[L^* \ C^* \ H]_u$, coefficient 'F' interpolates these two mapping functions in a linear manner.

In other words, when restraint coefficient 'F' takes '1' (one) in equation (29), the third term, i.e., surface control point mapping $JC_rPW_r$ does not work at all, and only the second term, i.e., gravity control point mapping $MW_m$ does work. On the contrary, when coefficient 'F' takes '0' (zero), only mapping $JC_rPW_r$ works and mapping $MW_m$ does not work at all.

The surface control point is used in order to set restraint coefficient 'F'. The surface control point is disposed on the device's gamut surface or near to the surface. The surface-control-point functions as a control point for mapping the gamut boundary.

In this second embodiment, eight surface-control-points are defined for the simple description; however, a number of the control points can be selected arbitrarily.

The eight surface control points are defined in digital counts of the device as follows: the primary color: red R: $(d_r, d_g, d_b)=(255, 0, 0)$, green G: $(d_r, d_g, d_b)=(0, 255, 0)$, and blue B: $(d_r, d_g, d_b)=(0, 0, 255)$. Secondary colors: yellow Y: $(d_r, d_g, d_b)=(255, 255, 0)$, magenta M: $(d_r, d_g, d_b)=(255, 0, 255)$, cyan C: $(d_r, d_g, d_b)=(0, 255, 255)$, white W: $(d_r, d_g, d_b)=(255, 255, 255)$, black B: $(d_r, d_g, d_b)=(0, 0, 0)$.

Restraint coefficient 'F' is given by equation (37).

$$F = w_{f,1}f_1 + w_{f,2}f_2 + \ldots + w_{f,9}f_9 \quad (37)$$

where $f_i$ and $w_{f,i}$ are given by equations (38) and (39) respectively.

$$f_i = \frac{\frac{1}{E_{s,f,i}}}{\sum_{j=1}^{8} \frac{1}{E_{s,a,j}} + \frac{1}{E_{s,f,j}}} \quad (38)$$

if $E_{s,f,i} = 0$ then $f_i = 1$ if $E_{s,a,i} = 0$ then $f_i = 1$ $$w_{f,i} = \frac{\frac{1}{D_{s,f,i}}}{\sum_{j=1}^{9} \frac{1}{D_{s,f,i}}} \quad (39)$$

if $D_{s,f,j} = 0$ then $w_{f,i} = 1, w_{f,k \neq l} = 0$ if $D_{s,f,k \neq l} = 0$ then $w_{f,k \neq l} = 0, w_{f,l \neq i \neq k} = 0$ $E_{s,f,i}$ represents an Euclidean distance between gravity vector $\mu_i$ of color category 'i' and color vector X in the CIELAB space. $E_{s,a,i}$ represents an Euclidean distance between surface control point 'i' and color vector X in the CIELAB space. Both of $E_{s,f,i}$ and $E_{s,a,i}$ show distances in the CRT display's color space.

When $E_{s,f,i}=0$, namely, color vector X agrees with gravity vector $\mu_i$, fi=1 which means constraint force becomes maximum extent, then surface-control-point-mapping $JC_rPW_r$ does not work at all, and only gravity-control-point-mapping $MW_m$ works. On the contrary, when $E_{s,a,i}=0$, namely, a test color agrees with the surface control point, $f_i = 0$ which means no constraint force is available, then gravity-control-point-mapping $MW_m$ does not work at all and only surface-control-point-mapping $JC_rPW_r$ works.

In equation (39), $D_{s,f,i}$ represents the normalized distance between gravity vector $\mu_i$ of color category 'i' and color vector X in the source device's color space.

When color vector X agrees with gravity vector $\mu_i$ of color category 'i', $w_{f,i}=1$ (one), and weighing coefficient $w_{f,k!=1}$ for other than color category 'i' becomes 0 (zero). Accordingly, $w_{f,i}$ is a weighing coefficient for constraint force $f_i$ determined following the position of color vector X. Nine gravity vectors have constraint forces $f_i$ respectively. Those forces are weighed by $w_{f,i}$ and then reflected to restraint coefficient 'F'.

The third term of equation (29) has four elements, i.e., surface control point difference matrix 'P', surface weighing coefficient $w_r$, source device's chroma saturation $C_r$, and gamut shape control coefficient matrix 'J', and these four are described hereinafter in this sequence.

Gravity control points of source device's color space are mapped to output device's color space by gravity control point mapping $FMW_m$. In the same manner, the surface control points in CRT display's color space are mapped to those in printer's color space by surface control point mapping $JC_r(1-F)PW_r$. In other words, elements of matrix 'M' replaced with the surface control points are matrix 'P', and matrix 'P' is given by equation (40).

$$P = \begin{bmatrix} L^*_{v,d,3} - L^*_{v,d,1} & L^*_{v,d,2} - L^*_{v,d,2} & L^*_{v,d,3} - L^*_{v,d,3} & \cdots & L^*_{v,d,8} - L^*_{v,d,8} \\ C^*_{v,d,1} - C^*_{v,d,1} & C^*_{v,d,2} - C^*_{v,d,2} & C^*_{v,d,3} - C^*_{v,d,3} & \cdots & C^*_{v,d,8} - C^*_{v,d,8} \\ 0 & 0 & H^*_{v,d,3} - H^*_{v,d,3} & \cdots & H^*_{v,d,8} - H^*_{v,d,8} \end{bmatrix} \quad (40)$$

When surface control point mapping restraint coefficient 'F'=1, coefficient 'F' restraints the entire mapping between the surface control points. Surface difference weighing coefficient $w_r$ is calculated with equation (41) based on the positional relation between pre-mapped colorimetric value $[L\ C\ H]_u$, and weighs the mapping operation by matrix 'P'.

$$w_{r,j} = \frac{\frac{1}{E_{s,a,i}}}{\sum_{j=1}^{8} \frac{1}{E_{S,a,j}}} \quad (41)$$

Saturation $C_r$ is given by equation (17) and functions as a chroma-dependent weighing coefficient such that $J(1-F)PW_r$ mapping works mainly in a high chroma region. Therefore, the third term $JC_r(1-F)PW_r$ does not work at all on the lightness axis.

Figure 25:
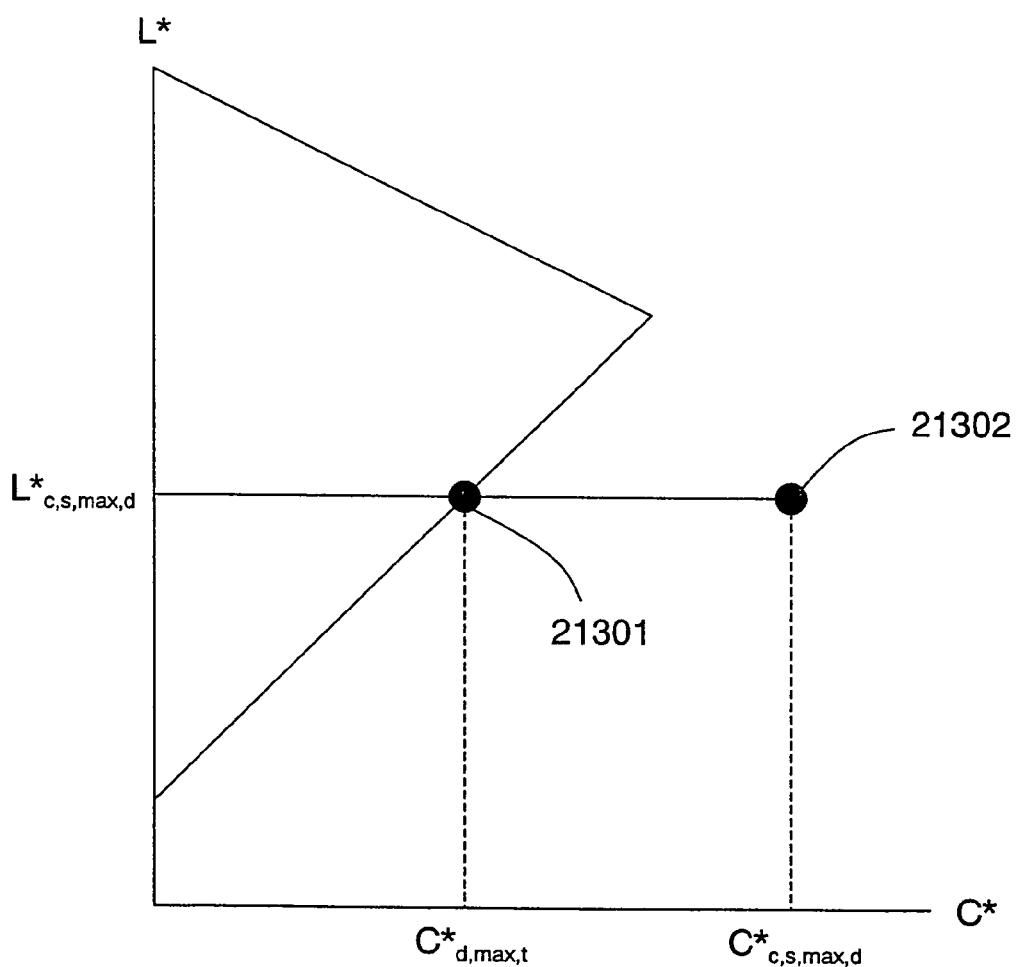
FIG. 25 illustrate chroma $C_{c,\ s,\ max,d}$ and chroma $C_{d,\ max,\ t}$ at finding gamut shape control coefficient $w_c$.

Matrix 'J' functions as mapping the gamut boundary of the source device to that of the output device with equation (42).

$$J = \begin{bmatrix} 1 & 0 & 0 \\ 0 & w_c & 0 \\ 0 & 0 & 1 \end{bmatrix} \quad (42)$$

where gamut shape control coefficient $w_c$ is given by equation (43), and it only controls chroma 'C*' and maps CRT display's gamut boundary to printer's gamut boundary.

$$w_c = \frac{C^*_{d,max,t} - C^*_{c,s,max,t} - FM_c w_m}{C_r(1-F)P_c w_r} \quad (43)$$

where $C^*_{d,max,t}$ corresponds to black point 21301 in FIG. 25, and black point 21302 is a point $[L^*\ C^*H]_{c,s,\ max,d}$ mapped with equation (44). FIG. 25 illustrates chroma $C^*_{c,s,max,d}$ and $C^*_{d,max,t}$ when coefficient $w_c$ is found.

$$\begin{bmatrix} L^* \\ C^* \\ H \end{bmatrix}_{c,s,max,d} = \begin{bmatrix} L^* \\ C^* \\ H \end{bmatrix}_{c,s,max,u} + FMw_m + C_r(1-F)P_c w_r \quad (44)$$

Equation (44) re-maps the point $[L^*\ C^*\ H]_{c,s,max,u}$ which has been pre-mapped from the point $[L^*\ C^*\ H]_{c,s,max,d}$ with equation (16). The point $[L\ C\ H]_{c,s,max,d}$ is main-mapped with equation (29). When black point 21302 moves to point 21301, a mapping point is determined to be on the gamut boundary of the output device. Therefore, equation (45) is established and control coefficient $w_c$ is found therefrom. Then an adjustment coefficient, which maps the gamut boundary of the source device to that of the output device, can be figured out.

$$C^*_{c,s,max,t} = C^*_{c,s,max,u} + FM_c + w_c C_r(1-F)PW_r \quad (45)$$

In equation (45), vector $M_c$ is a one-row, nine-column type row-vector, which is formed by taking out a chroma component out of gravity control point difference matrix 'M'. Vector $P_c$ is a one-line, eight-column type row-vector, which is formed by taking out a chroma component out of surface control point difference matrix 'P'.

As discussed above, gamut shape control coefficient $w_c$ functions compressing the chroma component of $C_r(1-F)PW_r$ to a linear type so that a color on source device's gamut boundary can be mapped onto the gamut boundary of the output device.

Exemplary Embodiment 3

A color information exchanging device in accordance with the third exemplary embodiment of the present invention is demonstrated hereinafter with reference to FIG. 26.

Figure 26:
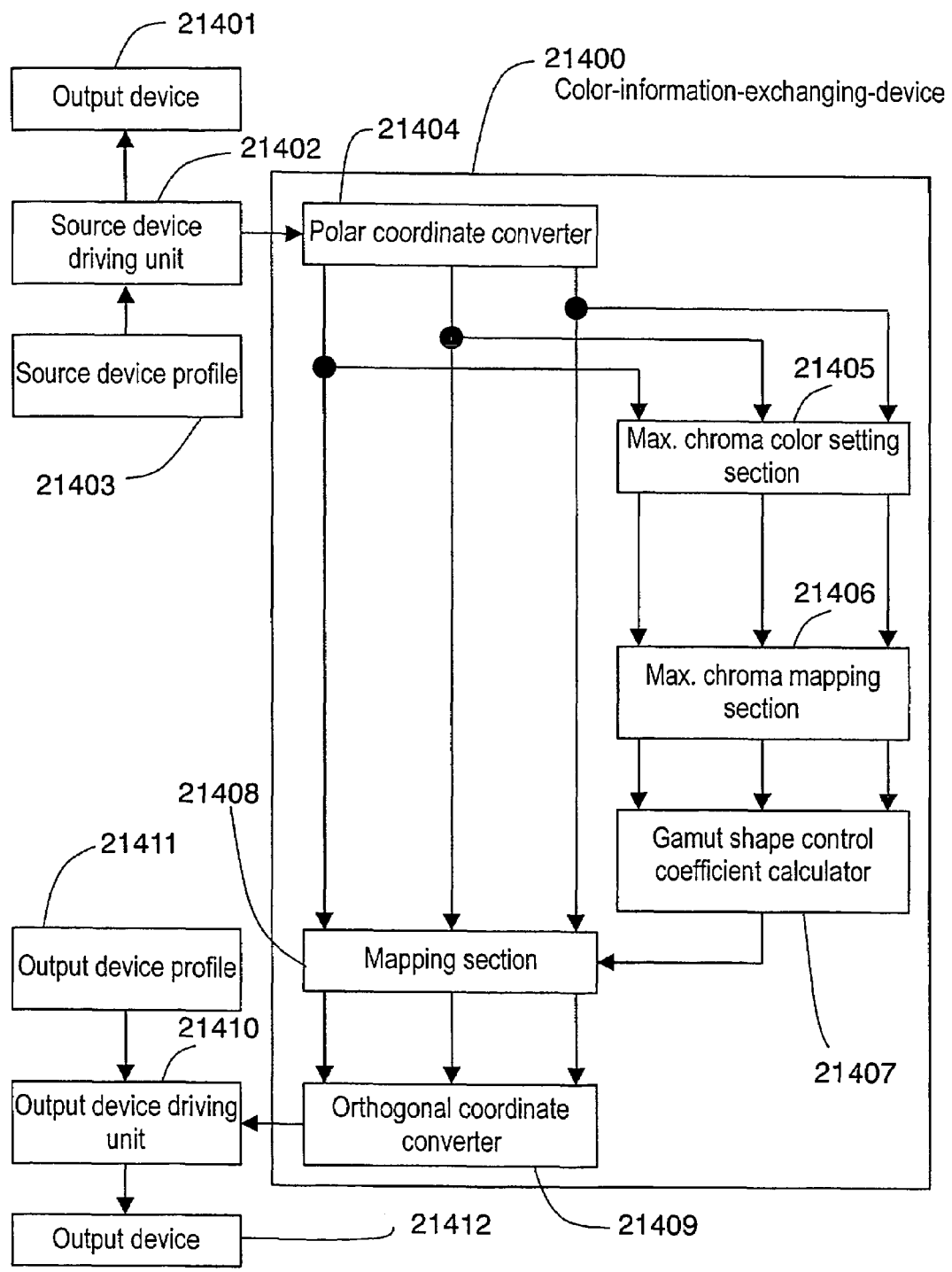
FIG. 26 is a block diagram of a color management system introducing a color information exchanging device in accordance with a third exemplary embodiment of the present invention.

FIG. 26 is a block diagram of a color management system introducing a color information exchanging device in accordance with the third exemplary embodiment of the present invention.

This third embodiment is designed based on an assumption that the gamut of a source device is not so much different from that of an output device. Therefore, a case, where the source device is a CRT display and the output device is a projection display, corresponds to the third embodiment. Another case, where both of the source and output devices employ CRT displays and yet the color temperatures of respective reference white color points are different, also corresponds to this third embodiment.

In the following description, the source device is a CRT display having a color temperature of 9300K (hereinafter referred to as 9300K-CRT display), and the output device is also a CRT display having a color temperature of 5000K (hereinafter referred to as 5000K-CRT display). It is assumed that an appearance of an image reproduced on the 5000K-CRT display is to agree with the image on the 9300K-CRT display, where a white color point appears more bluish.

In FIG. 26, source device driving unit 21402 displays an image on the source device 21401 (9300K-CRT display), and also sends out colorimetric values of displayed colors on the CRT display to color-information-exchanging-device 21400 by referring to the source device's input-output characteristics stored in profile 21403 for the source device.

Output device driving unit 21410 drives output device 21412 (5000K-CRT display), and also converts the colorimetric value supplied from exchanging-device 21400 to a drive signal which can be appropriately displayed on the 5000K-CRT display by referring to input-output characteristics of the 5000K-CRT display. The input-output characteristics are stored in profile 21411 for the output device.

Color information exchanging device 21400 of the present invention is described hereinafter. Polar coordinate converter 21404 converts the colormetric values of the displayed color on 9300K-CRT display into lightness, chroma, and hue. These converted values are supplied to two systems.

One of the systems is a gamut mapping system. In this system, after the process in mapping processing section 21408, gamut mapping is practiced to the lightness, chroma and hue of 9300K-CRT display.

The other system is a system for finding a gamut shape control coefficient. In this system, the lightness, chroma and hue of 9300K-CRT display undergo the processes by max. chroma color setting section 21405 and max. chroma color mapping section 21406, and then the lightness, chroma and hue are supplied to gamut shape control coefficient calculator 21407, where an adjustment coefficient is calculated as a gamut shape control coefficient which can map the gamut boundary of 9300K-CRT to that of 5000K-CRT display.

An output from mapping section 21408 is converted to a colorimetric value of orthogonal coordinate from the lightness, chroma and hue of the polar coordinate by orthogonal coordinate converter 21409, then the converted value is supplied to output device driving unit 21410.

In the mapping from 9300K-CRT display to 5000K-CRT display, the color information exchanging device of the present invention advantageously makes the color appearance of the image displayed on 5000K-CRT display agree with that on 9300K-CRT display by determining mapping points so that the color category of the source device agrees with that of the output device.

This third embodiment differs from the second embodiment in employing no pre-mapping process. Other than this difference, the structure and process are the same as those of the second embodiment, thus the descriptions thereof are omitted here.

In this third embodiment, since both the source and output devices employ CRT displays, gamut mapping due to the difference of the gamut shapes is not needed. The mapping in this third embodiment corresponds to the mapping, which produces a pair of which color appearances agree with each other, between the gamuts of almost the same shapes.

Therefore, the pre-mapping process, which corrects the difference in the gamut shapes, is not needed, and the mapping of the third embodiment makes color appearances agree with each other for realizing color reproduction in a natural way.

In conclusion, the colormetric values of the test colors or device drive levels obtained by color naming done by at least one viewer are grouped into color categories, where the color naming is performed to a plurality of test colors rendered on the source and output devices. Variance and other statistical characteristics are used for defining a normalized distance of each color category, and the relation between color perception of the viewer and color reproducibility is understood quantatively, so that gamut mapping is designed. This is an advantage of the present invention.

The present invention produces another advantageous effect: The color spaces CIELAB of the source and output devices are grouped into a plurality of color categories. Each device produces a normalized color space that is normalized by using a gravity vector calculated for each color category of respective devices and a variance covariance matrix expressing extension from a gravity point as a center. Then control points of the same color categories provided in the normalized color spaces are mapped, whereby color information is exchanged between the two normalized color spaces by agreeing the color categories with each other and preserving color perceptional quantity including chroma of two colors in respective normalized color spaces. This arrangement allows the entire impression of the images rendered on respective devices to appear to have as little difference as possible.

There is still another advantageous effect of the present invention: A pre-mapped color is produced by mapping the color rendered on the source device, where the lightness and chroma of this color have been changed. Then the lightness, chroma and hue of the pre-mapped color are changed by using a weighing coefficient based on a normalized distance for re-mapping the pre-mapped color. This arrangement allows the mapping between the devices having different gamuts to be designed as a gamut mapping based on clear references found through a standpoint of agreement of color categories.

When the gamut shapes of the source device and the output device are not so much different, the pre-mapping process, which maps source device's gamut into output device's gamut, can be omitted. Then a mapping which realizes an agreement of color categories is performed, so that the color appearance of the source device agrees with that of the output device. In other words, this arrangement can advantageously realize a matching of color appearances.

Although the present invention has been fully described by way of examples with reference to the accompanying drawings, it should be understood that numerous variations, modifications and substitutions, as well as rearrangements and combinations, of the preceding embodiments will be apparent to those skilled in the art without departing from the novel spirit and scope of this invention.

What is claimed is:

1. A method of normalizing color information for normalizing a color space using a statistical process for each color name, said method being used for controlling a colorimetric characterization of at least one of a source device and an output device, said method comprising the steps of:
   (a) rendering a test color on at least one of the source device and the output device;
   (b) observing the test color;
   (c) naming the test color with a color name;
   (d) grouping one of colorimetric values of the test color and a device drive level into each color name; and
   (e) normalizing color spaces of each color name using a statistical process based on one of the colorimetric values and the device drive level grouped in step (d).

2. The method of normalizing color information as defined in claim 1, wherein the statistical process in step (e) includes calculating a gravity vector and a variance covariance matrix from one of the colorimetric value and the device drive level, and normalizing the color space using the gravity vector and the variance covariance matrix.

3. The method of normalizing color information as defined in claim 1 or claim 2, wherein step (c) uses a categorical basic color as the color name.

4. The method of normalizing color information as defined in claim 3, wherein the categorical basic color includes one of red, brown, pink, orange, yellow, green, blue, purple, white, gray and black.

5. The method of normalizing color information as defined in claim 1 or claim 2, wherein step (c) is performed by a viewer using a memorized color name through question and answer practice.

6. The method of normalizing color information as defined in claim 1 or claim 2, wherein step (c) is performed by an viewer using a color name set by the viewer through question and answer practice.

7. A method of exchanging color information for transmitting color information from a source device to an output device, said method comprising the steps of:
   mapping a control point of the same color name disposed in a color space normalized by the method defined in claim 1 or claim 2; and
   exchanging the color information between the source device and the output device.

8. The method of exchanging color information as defined in claim 7, wherein the control point is a gravity vector calculated from one of the colorimetric value and the device drive level defined in claim 2.

9. The method of exchanging color information as defined in claim 7, wherein the control point is disposed one of (i) on the source device, (ii) on a gamut surface of the output device and (iii) near to the gamut surface.

10. The method of exchanging color information as defined in claim 7, wherein a part of the control point is a gravity vector calculated from the color information grouped based on a color naming by a viewer, and other control points than the part of the control point is disposed one of (i) on the source device, (ii) on a gamut surface of the output device and (iii) near to the gamut surface.

11. The method of exchanging color information as defined in claim 7, wherein the control point disposed in a color space of the source device agrees with that in a color space of the output device in terms of colorimetric value.

12. The method of exchanging color information as defined in claim 7, wherein the control point disposed in a color space of the source device agrees with that in a color space of the output device in terms of color appearance.

13. The method of exchanging color information as defined in claim 7, wherein a first control point, a part of the control point, disposed in a color space of the source device, agrees in terms of colorimetric value with a second point, another part of the control point, disposed in a color space of the output device, and wherein another control point other than the first control point disposed in the color space of the source device, agrees in terms of color appearance with another control point other than the second control point disposed in the color space of the output device.

14. The method of exchanging color information as defined in claim 7, wherein a colorimetric distance between the control point disposed in a color space of the source device and another control point disposed in a color space of the output device is minimized within a color reproduction range of both the devices.

15. The method of exchanging color information as defined in claim 7, wherein difference in color appearance between the control point disposed in a color space of the source device and another control point disposed in a color space of the output device is minimized within a color reproduction range of both the devices.

16. The method of exchanging color information as defined in claim 7, wherein a colorimetric distance between a first control point, a part of the control point, disposed in a color space of the source device and a second control point, a part of another control point, disposed in a color space of the output device, is minimized within an color reproduction range of both the devices, and wherein difference in color appearance between another control point other than the first control point, of the control point disposed in a color space of the source device and another control point, other than the second control point, of the another control point disposed in a color space of the output device is minimized within the color reproduction range of both the devices.

17. The method of exchanging color information as defined in claim 12, 13, 15 or 16, wherein when a control point where the color appearances agree with each other is found or where the difference of color appearance is minimized is found, a color in a cusp of a gamut between the source device and the output device is shown to a viewer, and then a color the viewer specified is used as one of a gravity control point and a surface control point of the output device.

18. The method of exchanging color information as defined in claim 7, wherein the mapping includes calculating a scaling coefficient which converts a distance between gravity vectors of the source device into that of the output device, and weighing the scaling coefficient responsive to a position of an input point for determining a mapping point.

19. The method of exchanging color information as defined in claim 7, wherein the mapping includes mapping between surface control points which includes calculating a scaling coefficient so that a surface control point of the source device mapped by gravity mapping is mapped again to a surface control point of the output device, and weighing the scaling coefficient responsive to a positional relation between an input point, a gravity control point and the surface control point for determining a mapping point.

20. The method of exchanging color information as defined in claim 18 or claim 19, wherein the weighing responsive to the positional relation between the gravity control point, the surface control point and the input point is given by an inverse of a distance between an input vector and the gravity control point.

21. The method of exchanging color information as defined in claim 18 or claim 19, wherein the weighing responsive to the positional relation between the gravity control point, the surface control point and the input point is given by a ratio of an inverse of a distance between an input vector and the gravity control point vs. an inverse of a distance between the input vector and the surface control point.

* * * * *